US012749843B2

(12) United States Patent
Hasegawa

(10) Patent No.: US 12,749,843 B2
(45) Date of Patent: Sep. 29, 2026

(54) ELECTRICAL CONNECTOR FOR CIRCUIT BOARDS

(71) Applicant: Hirose Electric Co., Ltd., Yokohama (JP)

(72) Inventor: Yohei Hasegawa, Yokohama (JP)

(73) Assignee: HIROSE ELECTRIC CO., LTD., Yokohama (JP)

( * ) Notice: Subject to any disclaimer, the term of this patent is extended or adjusted under 35 U.S.C. 154(b) by 342 days.

(21) Appl. No.: 18/660,621

(22) Filed: May 10, 2024

(65) Prior Publication Data

US 2024/0380154 A1 Nov. 14, 2024

(30) Foreign Application Priority Data

May 11, 2023 (JP) ................................. 2023-078416

(51) Int. Cl.
*H01R 13/50* (2006.01)
*H01R 12/71* (2011.01)
*H01R 13/502* (2006.01)

(52) U.S. Cl.
CPC ......... *H01R 13/502* (2013.01); *H01R 12/716* (2013.01)

(58) Field of Classification Search
CPC ............................ H01R 13/502; H01R 12/716
See application file for complete search history.

(56) References Cited

U.S. PATENT DOCUMENTS

| | | | | |
|---|---|---|---|---|
| 2023/0110901 A1* | 4/2023 | Sugiki | H01R 12/91 | 439/382 |
| 2026/0115234 A1* | 4/2026 | Semsey | A61K 2300/00 | |

FOREIGN PATENT DOCUMENTS

| | | |
|---|---|---|
| JP | 6198712 B2 | 9/2017 |

* cited by examiner

*Primary Examiner* — Neil Abrams
(74) *Attorney, Agent, or Firm* — Procopio, Cory, Hargreaves & Savitch LLP

(57) ABSTRACT

The terminals 111 have a connection portion 111D formed at one end of the terminals 111 and capable of being connected to a mounting face of a circuit board, a contact point portion 111E-1 formed at the other end of the terminals 111 and capable of making contact with a counterpart connect body, a stationary-side retained portion 111A retained in a stationary housing, a movable-side retained portion 111B retained in a movable housing, and a floating portion 111C located between the stationary-side retained portion 111A and the movable-side retained portion 111B and capable of resilient deformation, and the floating portion 111C is formed bulging in the connector width direction, which is parallel to the aforementioned mounting face and perpendicular to the terminal array direction.

4 Claims, 16 Drawing Sheets

ELECTRICAL CONNECTOR FOR CIRCUIT BOARDS

CROSS-REFERENCE TO RELATED APPLICATIONS

This application claims priority to Japanese Patent Application No. 2023-078416, filed May 11, 2023, the contents of which are incorporated herein by reference in its entirety for all purposes.

BACKGROUND

Technical Field

The present invention relates to an electrical connector for circuit boards disposed on a mounting face of a circuit board.

Background Art

Known connectors for circuit boards include, for example, the receptacle connector of Patent Document 1. In the receptacle connector of Patent Document 1, a plurality of receptacle-side connect bodies arranged side by side in a direction parallel to a mounting face of a circuit board are coupled by metal receptacle-side coupling members. Each receptacle-side connect body has a plurality of terminals, a stationary housing secured to the circuit board through the medium of said plurality of terminals, and a movable housing capable of relative motion with respect to said stationary housing. The terminals, which are made of metal strip-like pieces, are provided extending in a substantially rectilinear manner in the up-down direction perpendicular to the mounting face of the circuit board so as to span between the stationary housing and the movable housing.

The terminals, whose floating portions (deformable portions) located between the stationary housing and the movable housing are capable of deformation in the through-thickness direction thereof, permit floating, i.e. relative motion, of the movable housing with respect to the stationary housing in the array direction of the receptacle-side connect bodies as a result of such deformation.

PATENT DOCUMENTS

Patent Document 1

Japanese Patent No. 6,198,712

SUMMARY

Problems to be Solved

However, because in Patent Document 1 the floating portions are of a plate-like configuration with major faces perpendicular to the array direction of the receptacle-side connect bodies, the direction of their deformation, and consequently, the direction of floating of the movable housing, is limited to the aforementioned array direction. In addition, the floating portions, which allow for a limited amount of deformation due to being formed as rectilinear sections of short extent in the up-down direction, have room for improvement in terms of ensuring a greater amount of floating.

With such circumstances in mind, it is an object of the present invention to provide an electrical connector for circuit boards which, along with ensuring a high degree of freedom in the direction of floating of the movable housing, is capable of increasing the amount of floating.

Technical Solution (1) The inventive electrical connector for circuit boards, which is an electrical connector for circuit boards disposed on a mounting face of a circuit board, has a plurality of terminals arranged such that a direction parallel to the mounting face is the direction of the terminal array and a housing retaining the plurality of terminals, said housing comprises a stationary housing secured to the circuit board through the medium of the terminals and a movable housing capable of relative motion with respect to the stationary housing, and the terminals are provided spanning between the stationary housing and the movable housing.

In the present invention, such an electrical connector for circuit boards is characterized in that the terminals have a connection portion formed at the one end of the terminals and capable of being connected to a mounting face, a contact point portion formed at the other end of the terminals and capable of making contact with a counterpart connect body, a stationary-side retained portion retained in the stationary housing, a movable-side retained portion retained in the movable housing, and a floating portion located between the stationary-side retained portion and the movable-side retained portion and capable of resilient deformation, and the floating portion is formed bulging in the connector width direction, which is parallel to the mounting face and perpendicular to the terminal array direction.

In the present invention, the floating portion is formed in the shape of a bulge in the connector width direction and, therefore, is capable of resilient deformation not only in the connector width direction, but also in other directions, specifically, in the terminal array direction, or in a direction perpendicular to the circuit board. Accordingly, the degree of freedom in the direction of floating of the movable housing can be improved over the prior art. In addition, compared to when the floating portion is formed in a rectilinear configuration, as was done in the prior art, the floating portion can be formed of a greater length without increasing the height dimension of the terminals (dimension in a direction perpendicular to the circuit board), and the amount of deformation of the floating portion, and by extension, the amount of floating of the movable housing, can be proportionately increased.

(2) In the invention of (1), the connection portion may be formed extending in the connector width direction and be solder connectable to the mounting face, and the floating portion may bulge toward the side opposite to the connection portion in the connector width direction. With the floating portion bulging toward the side opposite to the connection portion in this manner, the floating portion and the connection portion do not overlap when the terminals are viewed in a direction perpendicular to the circuit board, thereby making it possible to easily visualize the state of solder connection of the connection portion to the mounting face.

(3) In the inventions of (1) or (2), the floating portion may be formed in a curved manner, and may have the curved apex portion thereof formed of smaller dimensions in the terminal array direction in comparison with other parts. If the floating portion is formed in a curved shape, said floating portion will undergo resilient deformation about the curved apex portion as a fulcrum point. With the dimensions of the curved apex portion in the terminal array direction made smaller than other parts as described above, said curved apex portion, and by extension, the entire floating portion, becomes even more likely to undergo resilient deformation.

(4) In any of the inventions of (1) through (3), among the plurality of terminals, at least a pair of adjacent terminals may constitute a pair used for differential signal transmission, and, in the pair of terminals, the dimensions between the two floating portions in the terminal array direction may be equal throughout the entire longitudinal extent of the floating portions. Keeping the dimensions between the two floating portions of a pair of terminals, i.e., the dimensions of the gap, equal throughout the entire longitudinal extent of the floating portions in this manner, allows for ensuring a more appropriate differential impedance in said pair of terminals.

Technical Effect

The present invention can provide an electrical connector for circuit boards which, along with ensuring a high degree of freedom in the direction of floating of the movable housing, is capable of increasing the amount of floating.

DETAILED DESCRIPTION

The embodiments of the present invention will be described hereinbelow with reference to the accompanying drawings.

Figure 1:
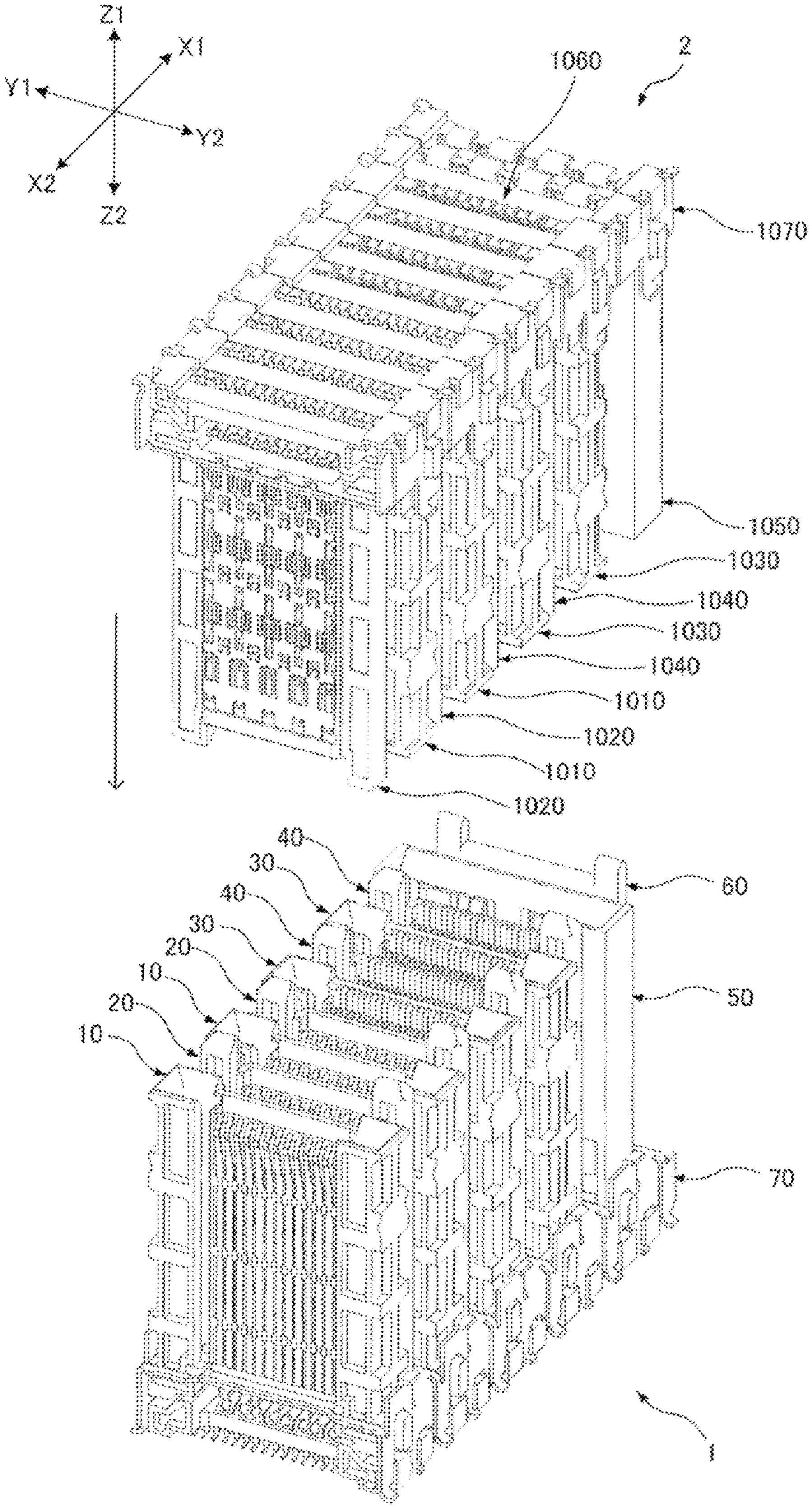
FIG. 1 is a perspective view illustrating a state prior to the mating connection of a connector combination according to an embodiment of the present invention and a counterpart connector combination to be matingly connected thereto.

FIG. 1, which is a perspective view of a connector combination 1 according to an embodiment of the present invention and a counterpart connector combination 2 to be matingly connected thereto, illustrates a state immediately prior to forming a mating connection. The connector combination 1 and the counterpart connector combination 2, which are electrical connectors for circuit boards disposed on the mounting faces of respectively different circuit boards (not shown), are matingly connected to each other such that the up-down direction perpendicular to the mounting surface of each circuit board (Z-axis direction) is the direction of mating connection. Specifically, the counterpart connector combination 2 is adapted to be matingly connected to the connector combination 1 from above (Z2 side).

The connector combination 1 has a plurality of connectors 10, 20, 30, 40, 50, 60 (designated as "connectors 10-60" hereinbelow), which are electrical connectors for circuit boards disposed and mounted on a mounting face of a circuit board, and a metal coupling member 70 coupling the connectors 10-60 arranged side by side such that a direction parallel to the mounting face of the circuit board (X-axis direction) is the connector array direction. At this time, the connectors 10-60 are disposed in an orientation that makes their width direction (connector width direction) coincide with the connector array direction (X-axis direction). The connectors 10-60 include multiple types connectors, specifically, high-speed socket connectors 10, high-speed plug connectors 20, high-density socket connectors 30, high-density plug connectors 40, a power supply socket connector 50, and a power supply plug connector 60.

Hereinbelow, the high-speed socket connectors 10 and high-speed plug connectors 20 are collectively referred to as "high-speed connectors 10, 20" if making a distinction is not particularly necessary, the high-density socket connectors 30 and the high-density plug connectors 40 are collectively referred to as "high-density connectors 30, 40" if making a distinction is not particularly necessary, and the power supply socket connector 50 and power supply plug connector 60 are collectively referred to as "power supply connectors 50, 60" if making a distinction is not particularly necessary.

In the present embodiment, as shown in FIG. 1, a high-speed socket connector 10, a high-speed plug connector 20, a high-speed socket connector 10, a high-speed plug connector 20, a high-density socket connector 30, a high-density plug connector 40, a high-density socket connector 30, a high-density plug connector 40, a power supply socket connector 50, and a power supply plug connector 60 are disposed in order from the X2 side in the connector array direction (X-axis direction) in the connector combination 1, with a total of 10 connectors provided.

In the present embodiment, the high-speed socket connectors 10 and the high-speed plug connectors 20, the high-density socket connectors 30 and the high-density plug connectors 40, the power supply socket connector 50 and the power supply plug connector 60 have a configuration permitting mating connection to each other. The high-speed connectors 10, 20 are electrical connectors that transmit high-speed differential signals. The high-density connectors 30, 40 are electrical connectors that transmit signals at a slower speed than the high-speed differential signals, with more terminals arranged side-by-side at a higher density than in the case of the high-speed connectors 10, 20. The power supply connectors 50, 60 are electrical connectors that transmit power signals.

Figure 2:
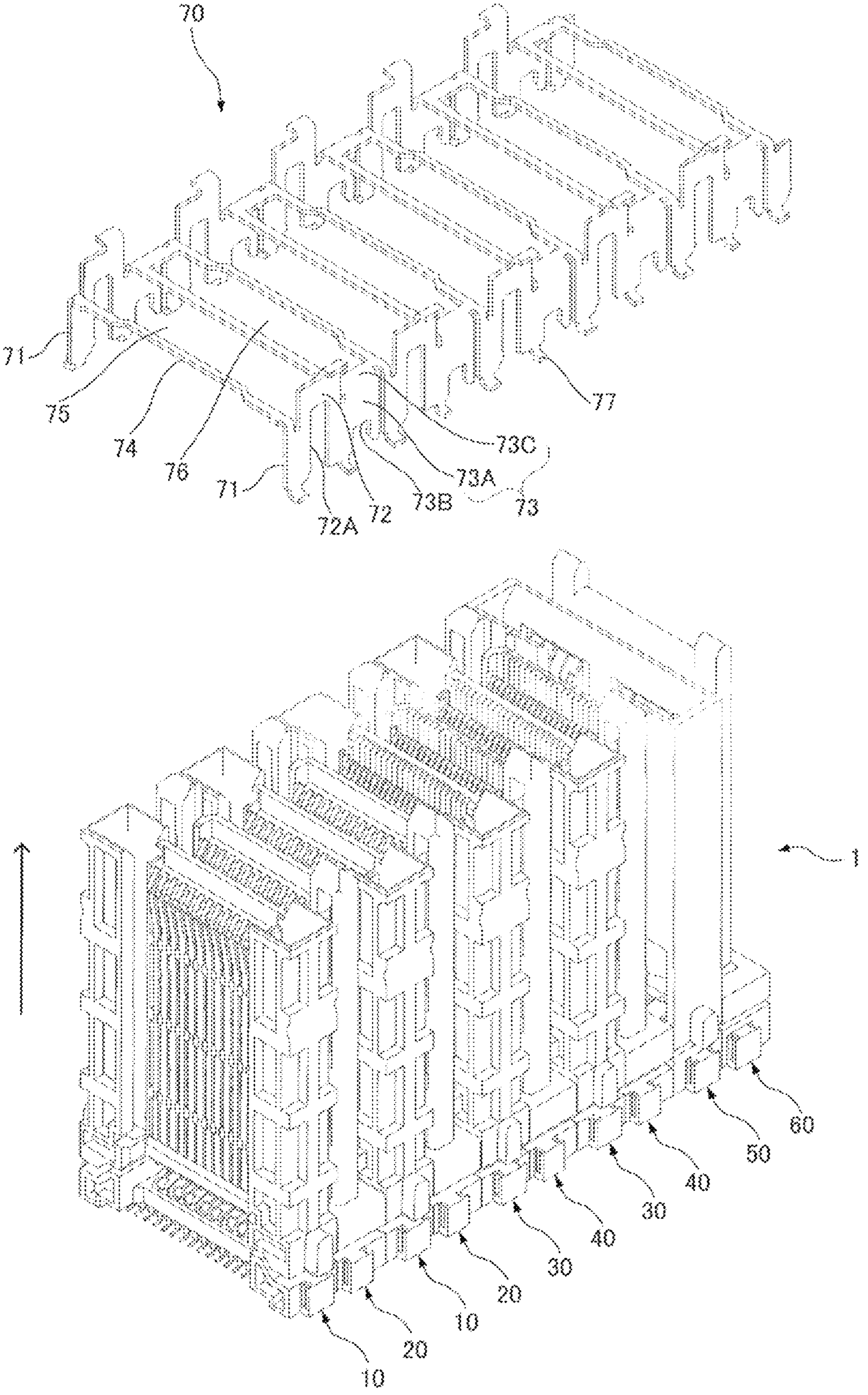
FIG. 2 is a perspective view illustrating an unassembled state of the connector combination of FIG. 1.

FIG. 2 is a perspective view illustrating an unassembled state of the connector combination 1. The connector combination 1 is assembled by attaching the connectors 10-60 to the coupling member 70 from below. The procedure of assembly of the connector combination 1 is described hereinafter in specific detail.

Figure 3:
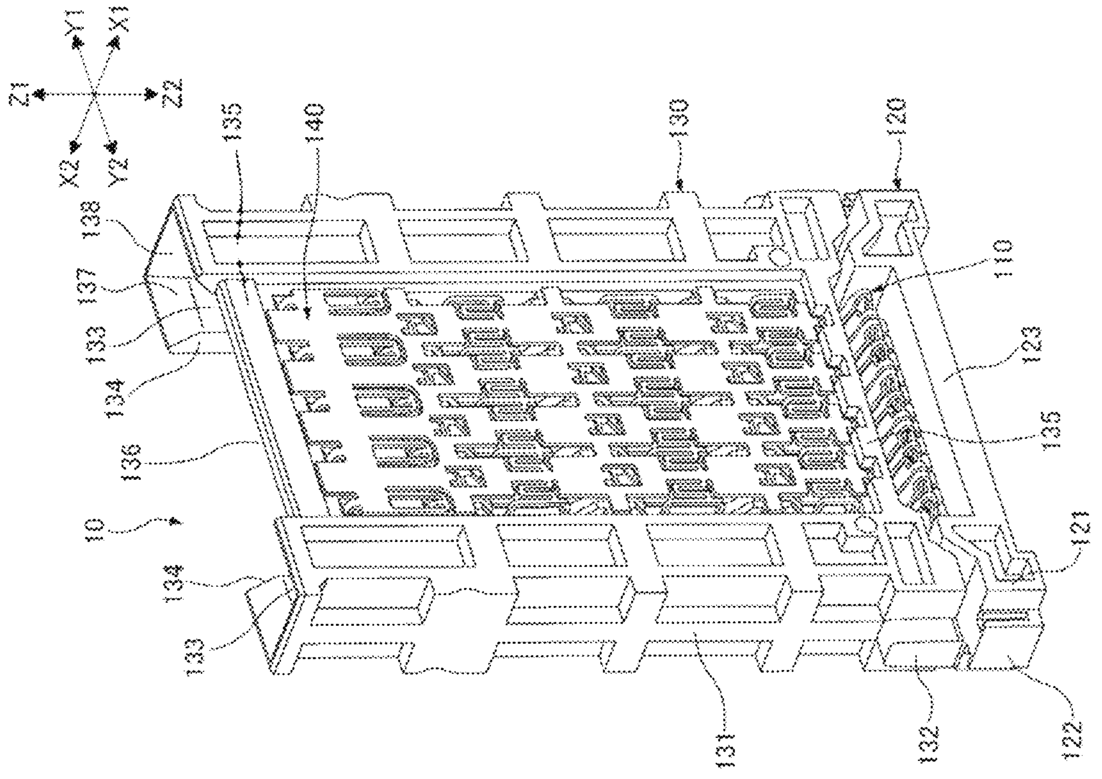
FIGS. 3 (A) and 3 (B) are a perspective view of a singular high-speed socket connector, wherein FIG. 3 (A) illustrates a state viewed from one side in the connector width direction, and FIG. 3 (B) a state viewed from the other side in the connector width direction.
Figure 3A:
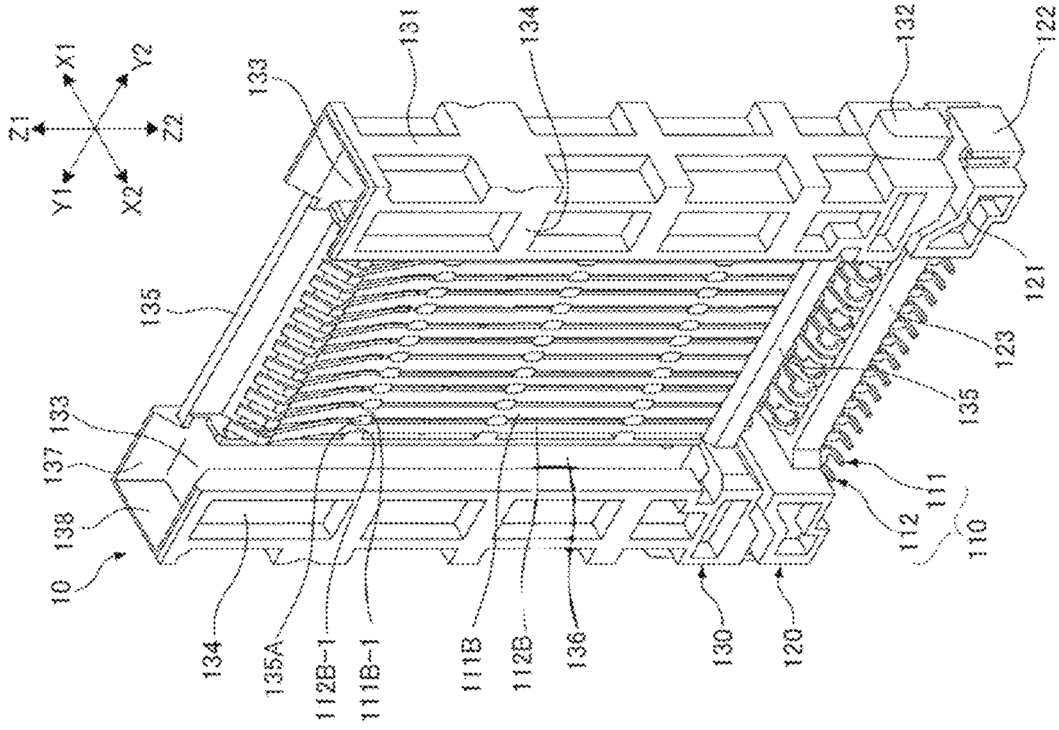
Figure 4:
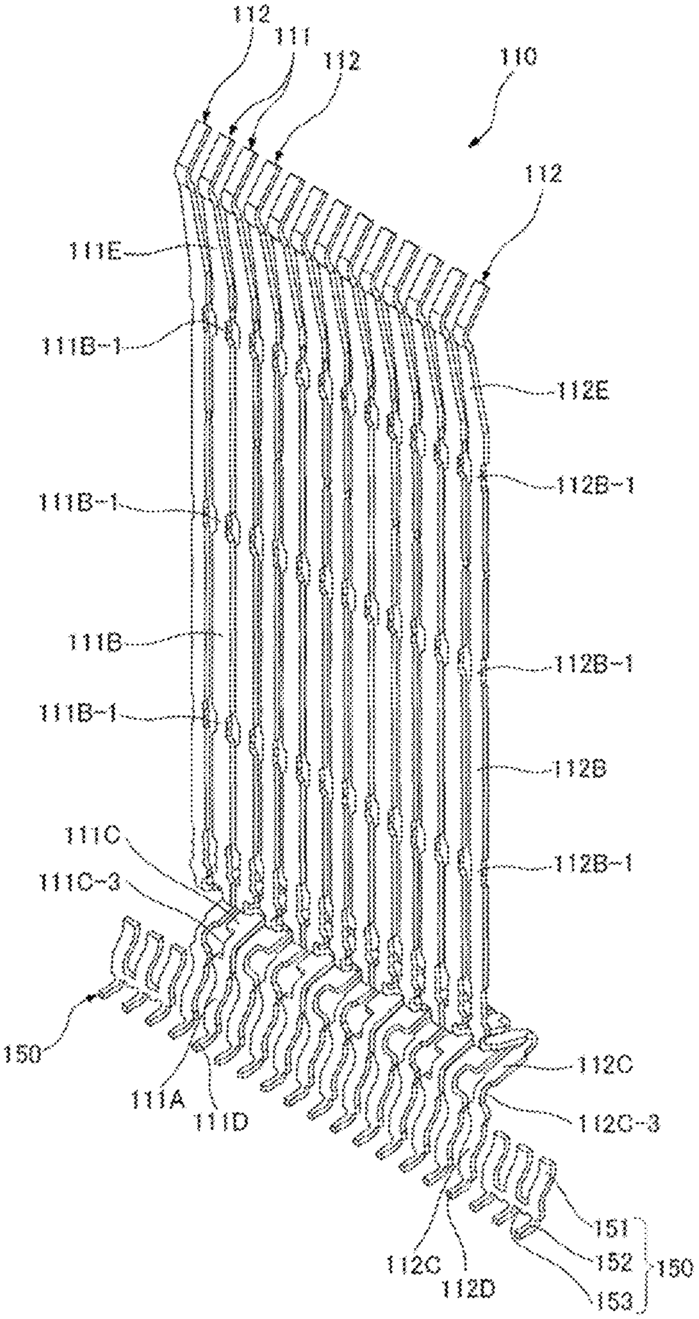
FIG. 4 (A) is a perspective view illustrating the high-speed socket terminals and anchor fittings of the high-speed socket connector illustrated in FIG. 3 (A), and FIG. 4 (B) is a lateral view of a high-speed signal terminal.
Figure 4:
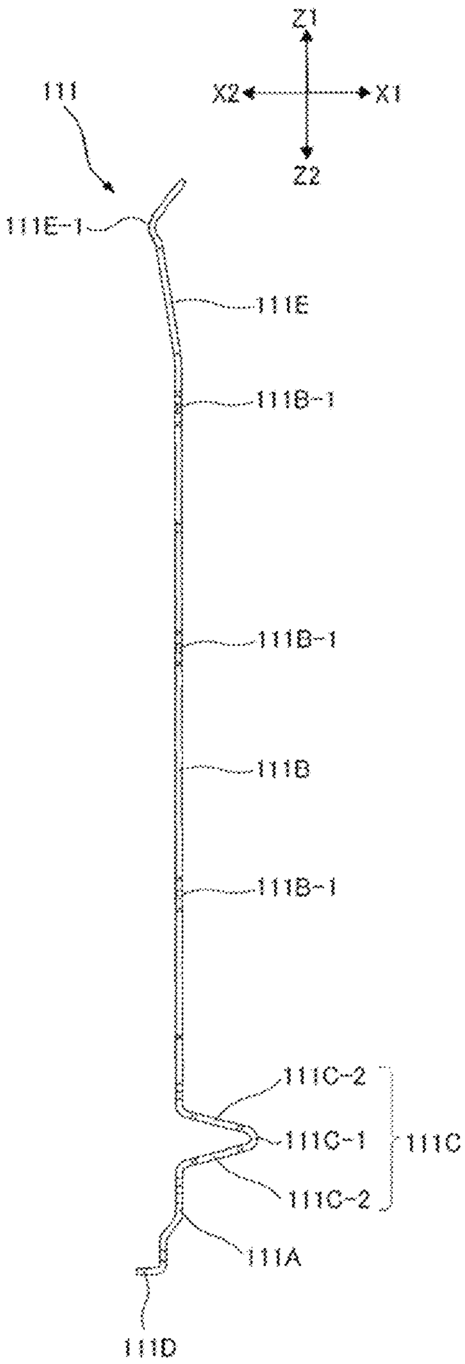

FIG. 3 (A) is a perspective view illustrating a singular high-speed socket connector 10 as viewed from one side (X2 side) in the connector width direction (X-axis direction), and FIG. 3 (B) is a perspective view illustrating the singular high-speed socket connector 10 as viewed from the other side (X1 side) in the connector width direction. FIG. 4 (A) is a perspective view illustrating the high-speed socket terminals 110 and anchor fittings 150 of the high-speed socket connector 10 illustrated in FIG. 3 (A), and FIG. 4 (B) is a lateral view of the hereinafter described high-speed signal terminals 111 of the high-speed socket terminals 110. As shown in FIG. 3 (A, B), the high-speed socket connector 10 has a plurality of metal high-speed socket terminals 110, socket housings 120, 130 (the hereinafter described "stationary socket housing 120" and "movable socket housing 130") made of plastic material or another electrically insulating material that retain the plurality of high-speed socket terminals 110, a metal ground plate 140 retained in the movable socket housing 130, and metal anchor fittings 150 retained in the stationary socket housing 120 (see FIG. 4 (A)).

The high-speed socket terminals 110 are arranged side by side such that the terminal array direction is the direction parallel to the mounting face of the circuit board, specifically, the direction (Y-axis direction) perpendicular to both the connector array direction (X-axis direction) and the up-down direction (Z-axis direction). The high-speed socket terminals 110, which are formed by bending a metal strip in the through-thickness direction, are disposed in an orientation that makes their terminal width direction coincide with the terminal array direction. As shown in FIG. 4 (A), the plurality of high-speed socket terminals 110 are a mix of high-speed signal terminals 111 and ground terminals 112. In a row of high-speed socket terminals 110, one ground terminal 112 is adjacently disposed on each side of two adjacent paired high-speed signal terminals 111. In the present embodiment, two paired high-speed signal terminals 111 form a pair capable of transmitting high-speed differential signals.

As shown in FIG. 4 (A, B), the high-speed signal terminals 111 have a stationary-side retained portion 111A retained in the stationary socket housing 120, a movable-side retained portion (socket retained portion) 111B retained in the movable socket housing 130, a floating portion 111C located between the stationary-side retained portion 111A and movable-side retained portion 111B, a connection portion 111D extending from the bottom end of the stationary-side retained portion 111A, and a resilient portion (socket resilient portion) 111E extending from the top end of the movable-side retained portion 111B.

As shown in FIG. 4 (A, B), the stationary-side retained portion 111A, which is generally crank-shaped when viewed in the terminal array direction (Y-axis direction), is embeddedly retained in the stationary socket housing 120 via integral molding (see FIG. 3 (A, B)). The movable-side retained portion 111B extends rectilinearly in the up-down direction. Narrowed-width portions 111B-1, whose terminal width dimensions (dimensions in the terminal array direction) are slightly smaller than those of the other components forming part of the movable-side retained portion 111B, are formed in the up-down direction at multiple locations of the movable-side retained portion 111B, which is retained in the movable socket housing 130 via integral molding using these narrowed-width portions 111B-1. At this time, as shown in FIG. 3 (A), the narrowed-width portions 111B-1 have their opposite lateral edges in the terminal array direction and X1-side major faces in the connector width direction covered and retained. That is to say, the X2-side major faces of the narrowed-width portions 111B-1 in the connector width direction are exposed from within the movable socket housing 130. Consequently, the X2-side major faces of the stationary-side retained portions 111A, which are exposed over the entire extent thereof in the up-down direction, form contact surfaces capable of contacting the counterpart terminals provided in the counterpart connector combination 2.

The connection portion 111D, which is bent out at the bottom end of the stationary-side retained portion 111A and extends in the connector width direction toward the X2 side, has its bottom face thereof solder connected to circuitry on the mounting face of the circuit board.

The floating portion 111C, which couples the top end of the stationary-side retained portion 111A and the bottom end of the movable-side retained portion 111B, is formed bulging in the connector width direction (X-axis direction) toward the X1 side, that is, toward the side opposite to the side on which the connection portion 111D is provided (X2 side). As shown in FIG. 4 (B), when viewed in the terminal array direction, the floating portion 111C is configured in a generally recumbent U-shape that is open on the X2 side while being convexly curved on the X1 side in the connector width direction.

Due to the fact that in the present embodiment the floating portion 111C is shaped in this manner, compared to when the floating portion is of a rectilinear configuration extending in the up-down direction, as was done in the prior art, the floating portion 111C is formed of a greater length without increasing the dimensions of the high-speed signal terminals 111 in the up-down direction, which makes it possible to ensure a greater spring length and, as a result, makes it possible to increase the amount of deformation of the floating portion 111C and, by extension, the amount of floating of the movable socket housing 130. In addition, since the floating portion 111C bulges toward the side opposite to the connection portion 111D, when a high-speed signal terminal 111 is viewed from above (Z1 side), the floating portion 111C and the connection portion 111D do not overlap, which makes it possible to easily visualize the state of solder connection of the connection portion 111D to the mounting face.

The floating portion 111C is capable of resilient deformation to increase or decrease the spacing between the two leg portions 111C-2 by using the curved apex portion 111C-1 as a fulcrum point and, furthermore, is capable of resilient deformation by using the location of coupling to the top end of the stationary-side retained portion 111A and the location of coupling to the bottom end of the movable-side retained portion 111B, respectively, are used as fulcrum points. This floating portion 111C is capable of resilient deformation in any direction, that is, in the connector width direction (X-axis direction), in the terminal array direction (Y-axis direction), and in the up-down direction (Z-axis direction), such that relative motion of the movable socket housing 130 with respect to the stationary socket housing 120 is permitted in these directions. Therefore, the degree of freedom in the direction of floating of the movable socket housing 130 can be improved over the prior art.

Figure 5:
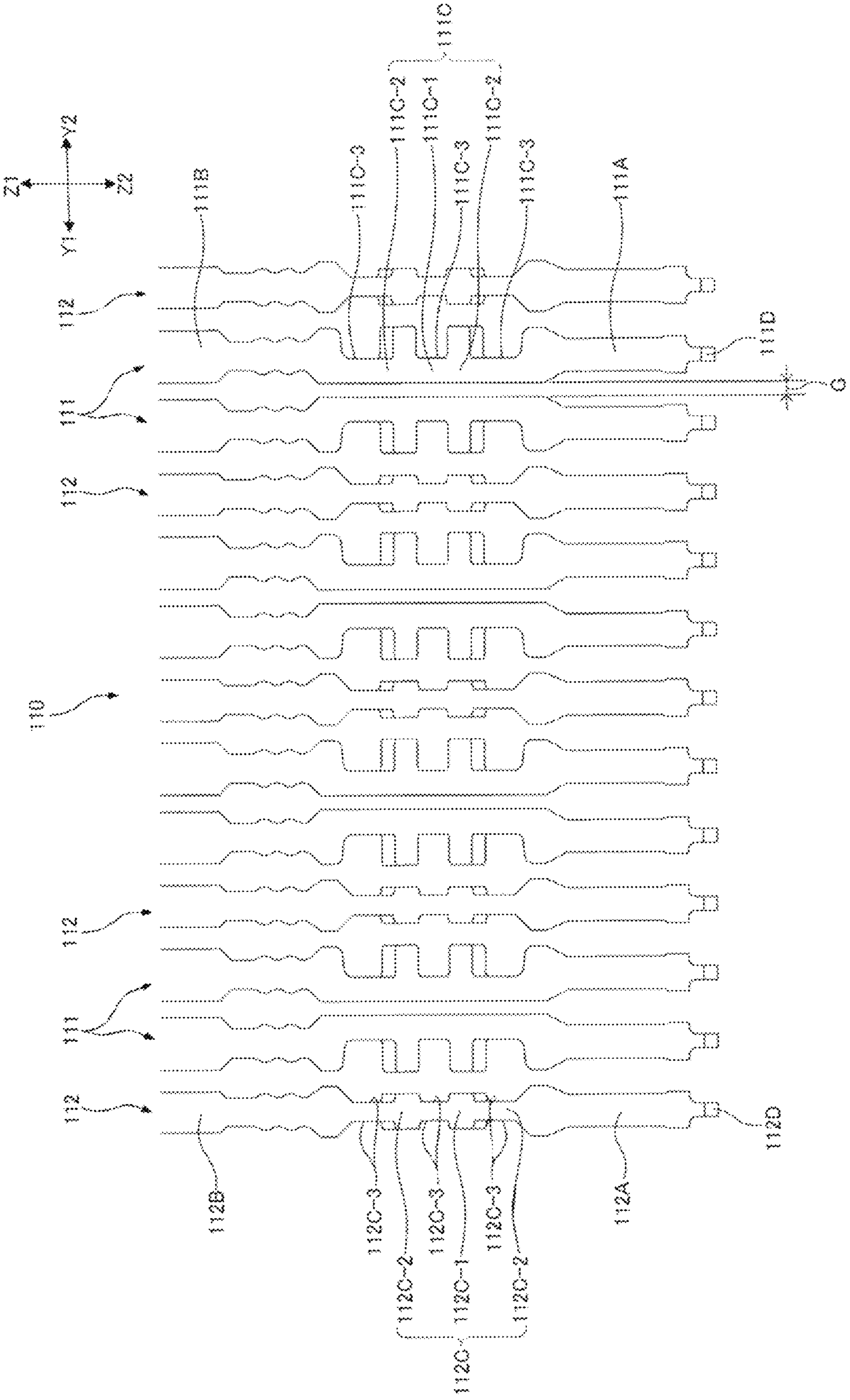
FIG. 5 is a front view illustrating the bottom portions of the high-speed socket terminals illustrated in FIG. 4 (A), as viewed from one side in the connector width direction.

FIG. 5 is a front view illustrating the bottom portions of the high-speed socket terminals 110 illustrated in FIG. 4 (A) as viewed from the X2 side in the connector width direction (X-axis direction). As shown in FIG. 4 (A) and FIG. 5, the floating portion 111C has notched portions 111C-3 formed in the sections serving as fulcrum points during resilient deformation, specifically, in the curved apex portion 111C-1, in the section coupling to the top end of the stationary-side retained portion 111A, and in the section coupling to the bottom end of the movable-side retained portion 111B, with these sections being of a smaller size, that is, of a narrower width, in the terminal array direction than other components forming part of the floating portion 111C. Accordingly, these narrowed-width sections and, by extension, the entire floating portion 111C, become more likely to undergo resilient deformation and, as a result, excellent floating of the movable socket housing 130 is realized.

In addition, in the present embodiment, as shown in FIG. 5, notched portions 111C-3 are formed in the floating portions 111C of two adjacent paired high-speed signal terminals 111 in their lateral edges located on mutually opposed sides. As a result, the floating portions 111C are of symmetric shapes in the terminal array direction. Accordingly, the notched portions 111C-3 are not formed in lateral edges located in close proximity to each other and, as shown in FIG. 5, the dimension G between a pair of floating portions 111C in the terminal array direction is equal throughout the entire longitudinal extent of the floating portions 111C. Therefore, a more appropriate differential impedance can be ensured in the two paired high-speed signal terminals 111.

The resilient portions 111E, which are not supported by the movable socket housing 130, are capable of resilient deformation in the through-thickness direction thereof. The X2-side major faces of the resilient portions 111E form contact surfaces capable of contacting the counterpart terminals provided in the counterpart connector combination 2. As shown in FIG. 4 (B), the resilient portion 111E extends from the top end of the movable-side retained portion 111B at a slight incline toward the X2 side in the connector width direction (X-axis direction) as one moves upward and is subsequently bent and extends at an incline toward the X1 side as one moves upward. This bent section, i.e., the section protruding on the X2 side, is formed as a socket contact point portion 111E-1 capable of contacting a counterpart terminal.

In the present embodiment, the terminal width dimension, i.e., the dimension in the terminal array direction, of the resilient portion 111E, is smaller than the maximum width dimension of the movable-side retained portion 111B, i.e., the width dimension of the sections other than the narrowed-width portions 111B-1 in the movable-side retained portion 111B. In other words, the cross-sectional area of the resilient portion 111E (surface area of a cross-section perpendicular to the longitudinal direction of the high-speed signal terminal 111) is made smaller than the maximum cross-sectional area in the movable-side retained portion 111B. Specifically, the width of the resilient portion 111E is made gradually smaller as one moves upward from the top end of the movable-side retained portion 111B, with the width becoming smallest in the socket contact point portion 111E-1. In addition, the section above the top end of the socket contact point portion 111E-1 is formed of the same terminal width as said socket contact point portion 111E-1.

The ground terminals 112 have a stationary-side retained portion 112A, a movable-side retained portion 112B, a floating portion 112C, a connection portion 112D, and a resilient portion 112E. With the exception of the movable-side retained portion 112B and the floating portion 112C, the ground terminals 112 are of the same shape as the high-speed signal terminals 111. The dimension of the movable-side retained portion 112B in the terminal width direction (terminal array direction) is made smaller, that is, narrower, than that of the movable-side retained portion 111B of the high-speed signal terminals 111. The floating portion 112C is identical to the floating portion 111C of the high-speed signal terminals 111 in that, when viewed in the terminal array direction, it is configured in a generally recumbent U-shape convexly curved on the X1 side in the connector width direction and has a curved apex portion 112C-1 and two leg portions 112C-2, and in addition, in that notched portions 112C-3 are formed in the curved apex portion 112C-1, in the section coupling to the top end of the stationary-side retained portion 112A, and in the section coupling to the bottom end of the movable-side retained portion 112B. However, as shown in FIG. 5, the floating portion 112C is different from the floating portion 111C in that the notched portions 112C-3 are formed in the opposed lateral edges of the floating portion 112C.

As shown in FIG. 3 (A, B), the socket housings 120, 130 include the stationary socket housing 120, which is secured to a circuit board through the medium of the high-speed socket terminals 110, and the movable socket housing 130, which is capable of relative motion with respect to the stationary socket housing 120. The stationary socket housing 120 has stationary-side end wall portions 121 serving as end portions provided at the opposite ends of the stationary socket housing 120 in the terminal array direction, and a stationary-side retaining portion 123 extending in the terminal array direction and coupling the two stationary-side end wall portions 121.

The stationary-side end wall portions 121 are located outside of the terminal array range in the terminal array direction and embeddedly retain a portion of the anchor fittings 150 via integral molding. In addition, the stationary-side end wall portions 121 have press-fit portions 122 protruding from the exterior wall surfaces located outwardly in the terminal array direction (surfaces perpendicular to the terminal array direction). They are adapted to be press-fittingly retained by the hereinafter described long groove portions 72A (see FIG. 13 (A, B)) of the coupling member 70.

In addition, the stationary-side retaining portion 123, which extends across the terminal array range in the terminal array direction, embeddedly retains the stationary-side retained portions 111A, 112A of the high-speed socket terminals 110 via integral molding.

As shown in FIG. 3 (A, B), the movable socket housing 130 has movable-side end wall portions 131 located on the opposite outer sides of the terminal array range in the terminal array direction and extending in the up-down direction, and extended portions 135 serving as a plurality of movable-side lateral wall portions provided within the terminal array range in the terminal array direction along the high-speed socket terminals 110 and coupling the two movable-side end wall portions 131. The movable socket housing 130, which has formed therein a vertically extending and upwardly open receiving space 136, is adapted to receive a high-speed plug connector 1020, i.e., a counterpart connector, within said receiving space 136.

In the bottom portions of the movable-side end wall portions 131, there are provided restricted portions 132 protruding from the exterior wall surfaces located outwardly in the terminal array direction (surfaces perpendicular to the terminal array direction). The restricted portions 132 have a generally quadrangular cylindrical shape extending in the up-down direction. Along with being accommodated within the hereinafter described long groove portions 72A of the coupling member 70 (see FIG. 13 (A, B)), the restricted portions 132 are adapted to be restricted in movement in the connector width direction (in the X1 direction and in the X2 direction) and upward (in the Z1 direction) by the inner edges of said long groove portions 72A.

Groove-shaped guiding portions 133, which are recessed from the interior surface in the terminal array direction while extending in the up-down direction, are formed in the movable-side end wall portions 131 as part of the receiving space 136. During mating with the counterpart connector combination 2, the guiding portions 133 are adapted to guide the end portions of the movable plug housing 1230 of the high-speed plug connector 1020 provided in said counterpart connector combination 2 in the up-down direction. In addition, within the same range as the guiding portions 133 in the terminal array direction (Y-axis direction), the movable-side end wall portions 131 have end supporting portions 134 that are located closer to the X1 side than the guiding portions 133 in the connector width direction (X-axis direction) and extend along the guiding portions 133 in the up-down direction. When mated with the counterpart connector combination 2, the end supporting portions 134 are adapted to support the guided portions 231A, i.e. the end portions, of the movable plug housing 230 accommodated within the guiding portions 133 toward the X1 side, i.e., toward the high-speed socket terminals 110. In this manner, in the present embodiment, the movable-side end wall portions 131 are used for guiding and supporting the movable plug housing 1230.

In addition, as shown in FIG. 3 (A, B), inclined faces 137, 138 intended for guiding the movable plug housing 1230 toward the guiding portions 133 are formed in the top end portions of the movable-side end wall portions 131. Specifically, the inclined faces 137, which are inclined toward the guiding portions 133 in the connector width direction (X-axis direction) as one moves downward, guide the end portions of the movable plug housing 1230 in the connector width direction. The inclined faces 138, which are inclined toward the guiding portions 133 in the terminal array direction (Y-axis direction) as one moves downward, guide the end portions of the movable plug housing 1230 in the terminal array direction.

The extended portions 135 extend across the terminal array range at locations that are closer to the X1 side than the guiding portions 133 in the connector width direction (X-axis direction). In the present embodiment, in which five extended portions 135 are provided in a spaced relationship in the up-down direction, window portions (not shown) disposed in the connector width direction are formed between every two adjacent extended portions 135. As a result, the movable-side retained portions 111B of the high-speed socket terminals 110 are exposed from within the movable socket housing 130 through said window portions toward the X1 side in the area where the aforementioned window portions are formed. In the present embodiment, in which the aforementioned window portions are formed in most of the up-down direction, the movable-side retained portions 111B are consequently exposed over a wide area.

In addition, in the present embodiment, among the five extended portions 135, the four extended portions 135 formed at a plurality of locations within the range of the movable-side retained portions 111B in the up-down direction serve as movable-side retaining portions intended for retaining the movable-side retained portion 111B. Specifically, the extended portion 135 in the lowest position among the aforementioned four extended portions 135 embeddedly retains the bottom end portion of the movable-side retained portion 111B. The other three extended portions 135, which are provided at locations corresponding to the narrowed-width portions 111B-1 (see FIG. 4 (A)) in the up-down direction, have protrusions 135A protruding toward the X2 side at locations corresponding to midpoints between two narrowed-width portions 111B-1 adjacent in the terminal array direction. Along with supporting the X1-side major faces of the narrowed-width portions 111B-1, these extended portions 135 retain the opposite lateral edges of the narrowed-width portions 111B-1 with the help of the protrusions 135A.

The receiving space 136 is formed in the range of the guiding portions 133 in the connector width direction (X-axis direction), in the range between the two interior wall surfaces (surfaces perpendicular to the terminal array direction) of the two guiding portions 133 in the terminal array direction (Y-axis direction), and in the range extending from the top end of the movable socket housing 130 to the location of the upper face of the lowermost extended portion 135 in the up-down direction (Z-axis direction). In addition, as shown in FIG. 3 (A), the receiving space 136 is open toward the side opposite to the high-speed socket terminals 110 in the connector width direction, i.e., toward the X2 side, within the terminal array range in the terminal array direction as well as throughout the entire range in the up-down direction.

The ground plate 140, which is formed by cutting and raising parts of a sheet metal member of a generally rectangular outer shape, is provided in a manner to cover the movable-side retained portions 111B and resilient portions 111E of all the high-speed socket terminals 110 from the X1 side in the connector width direction. In the present embodiment, the ground plate 140 is retained in the movable socket housing 130 by being press-fitted from the X1 side into attachment aperture portions (not shown) formed in the extended portions 135 using a plurality of mountable portions (not shown) cut and raised toward the X1 side.

In addition, grounding contact pieces (not shown) cut and raised toward the X1 side are provided in the ground plate 140 at locations corresponding to the ground terminals 112 in the terminal array direction. These grounding contact pieces, which are formed at a plurality of locations in the up-down direction, are adapted to make contact with the ground terminals 112 at these locations from the X1 side.

As shown in FIG. 4 (A), one anchor fitting 150, formed by bending a sheet metal member in the through-thickness direction, is provided on each external side of the terminal array range of the high-speed socket terminals 110. The anchor fittings 150 are shaped by coupling the bottom portions (stationary-side retained portions 111A and connection portions 111D) of three adjacent high-speed socket terminals 110 at intermediate locations in the longitudinal direction. The anchor fittings 150 have retained portions 151 of the same shape as the stationary-side retained portions 111A, anchoring portions 152 of the same shape as the connection portions 111D, and a coupling portion 153 that couples the adjacent retained portions 151 together. The anchor fittings 150, which are disposed in alignment with the bottom portions of the high-speed socket terminals 110, have their retained portions 151 embeddedly retained by the stationary-side end wall portions 121 of the stationary socket housing 120 via integral molding.

Figure 6:
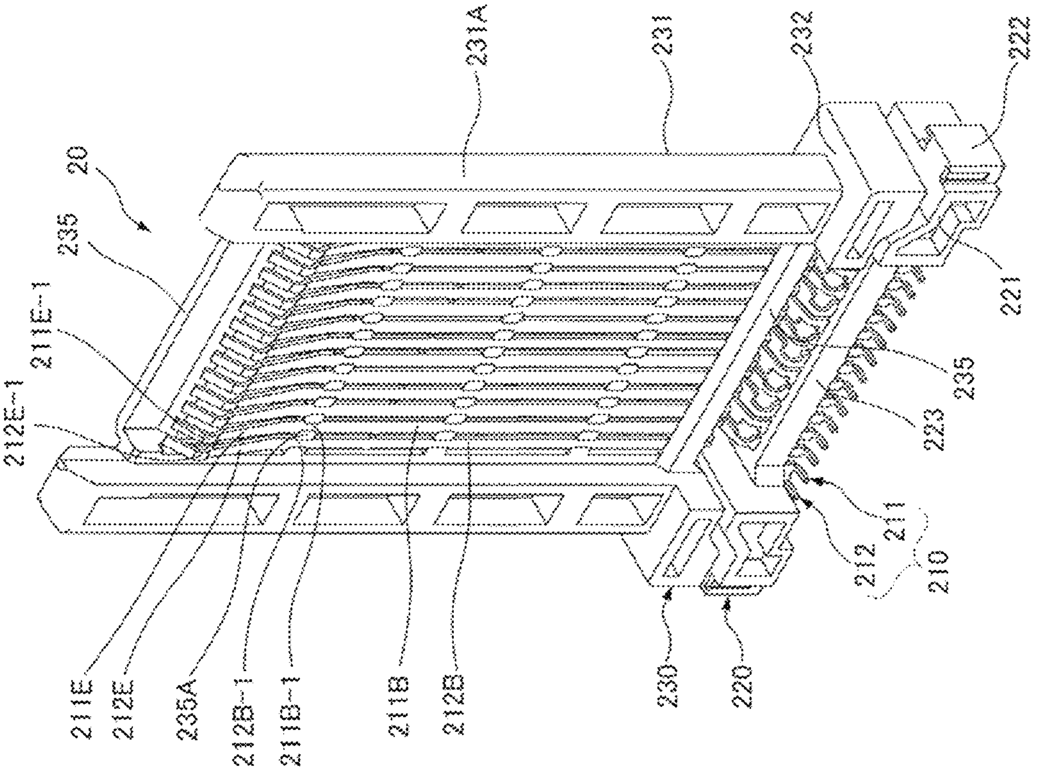
FIGS. 6 (A) and 6 (B) are perspective views of a singular high-speed plug connector, wherein FIG. 6 (A) illustrates a state viewed from one side in the connector width direction, and FIG. 6 (B) a state viewed from the other side in the connector width direction.
Figure 6:
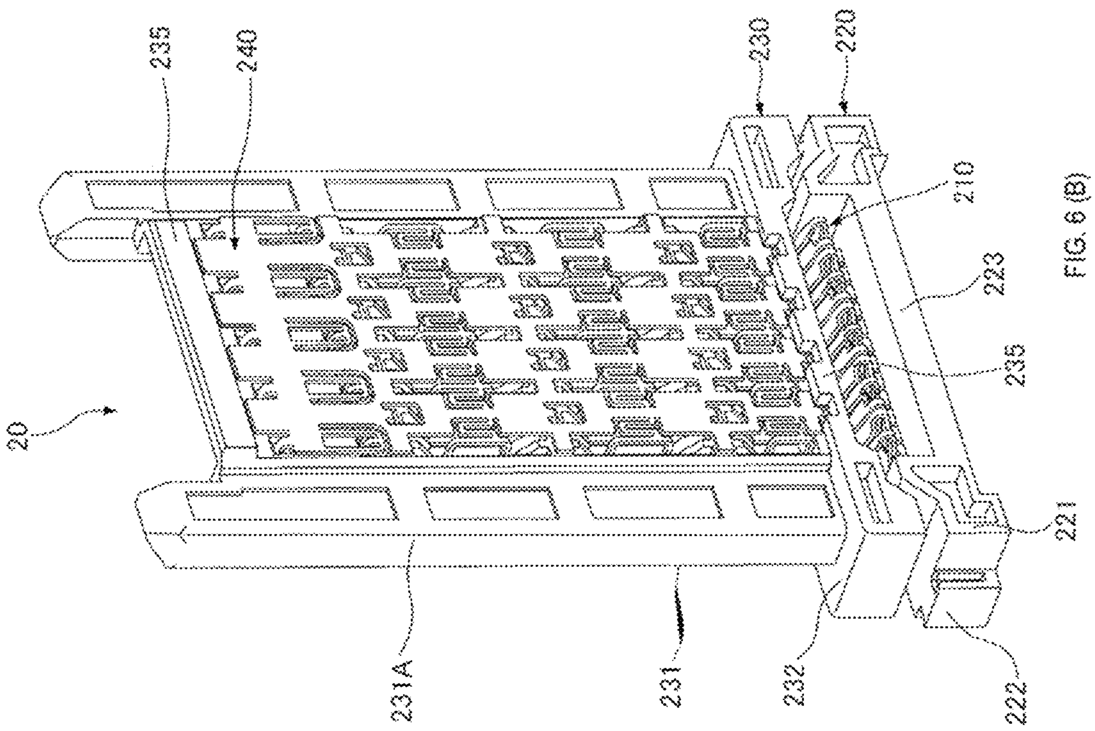

FIG. 6 (A, B) is a perspective view of a singular high-speed plug connector 20, wherein FIG. 6 (A) illustrates a state viewed from one side (X2 side) in the connector width direction, and FIG. 6 (B) a state viewed from the other side (X1 side) in the connector width direction. In the high-speed plug connector 20 of FIG. 6 (A, B), reference numerals obtained by adding "100" to the reference numerals used in the case of the high-speed socket connector 10 are assigned to sections corresponding to the high-speed socket connector 10. The high-speed plug connector 20 has high-speed plug terminals 210, plug housings 220, 230 (a "stationary plug housing 220" and a "movable plug housing 230"), a ground plate 240, and anchor fittings 250.

The high-speed plug connector 20 is connectable to a high-speed socket connector 1010 serving as a counterpart connector provided in the counterpart connector combination 2 by plugging into the receiving space of said high-speed socket connector 1010. The high-speed plug connector 20 differs from the high-speed socket connector 10 in the shape of the movable plug housing 230. The high-speed plug connector 20 will be discussed herein with emphasis on the configuration of the movable plug housing 230. In addition, since the high-speed plug terminals 210, stationary plug housing 220, ground plate 240, and anchor fittings 250 of the high-speed plug connector 20 are identical in shape, respectively, to the high-speed socket terminals 110, stationary socket housing 120, ground plate 140, and anchor fittings 150 of the high-speed socket connector 10, a detailed description of their configuration is omitted herein. It should be noted that the high-speed plug terminals 210 can make contact with counterpart terminals using movable-side retained portions 211B serving as plug retained portions as well as resilient portions 211E serving as plug resilient portions, which have plug contact point portions 211E-1 formed therein.

As shown in FIG. 6 (A, B), the shape of the movable-side end wall portions 231 of the movable plug housing 230 is different from the movable-side end wall portions 131 of the movable socket housing 130. The movable-side end wall portions 231, in which sections other than the bottom portions thereof are made smaller than said bottom portions in the connector width direction (X-axis direction) and in the terminal array direction (Y-axis direction), are formed as generally square cylindrical guided portions 231A extending in the up-down direction (Z-axis direction). The guided portions 231A, in addition to entering the guiding portions 133 of the movable socket housing 130 and being guided in the up-down direction in the process of connector mating, have their exterior wall surfaces on the X2 side in the connector width direction adapted to be supported by the end supporting portions 134 of the movable socket housing 130 when the connectors are in a mated condition.

In the bottom portions of the movable-side end wall portions 231, the outward end portions in the terminal array direction, i.e., the sections located outwardly of the guided portions 231A, constitute restricted portions 232. When the movable plug housing 230 is attached to the coupling member 70, the restricted portions 232 are adapted to be located directly below the hereinafter described plug restricting portions 73C of the coupling member 70 and be restricted in upwardly directed motion by said plug restricting portions 73C (see FIG. 14 (B)).

Figure 7:
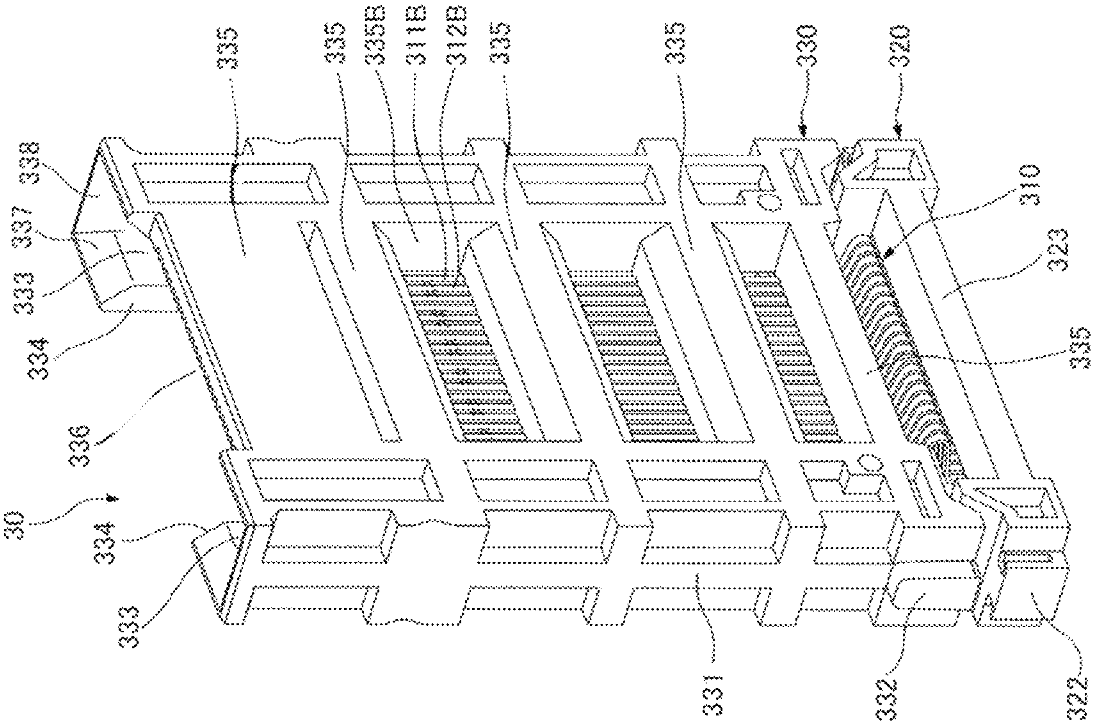
FIGS. 7 (A) and 7 (B) are perspective views of a singular high-density socket connector, wherein FIG. 7 (A) illustrates a state viewed from one side in the connector width direction, and FIG. 7 (B) a state viewed from the other side in the connector width direction.
Figure 7:
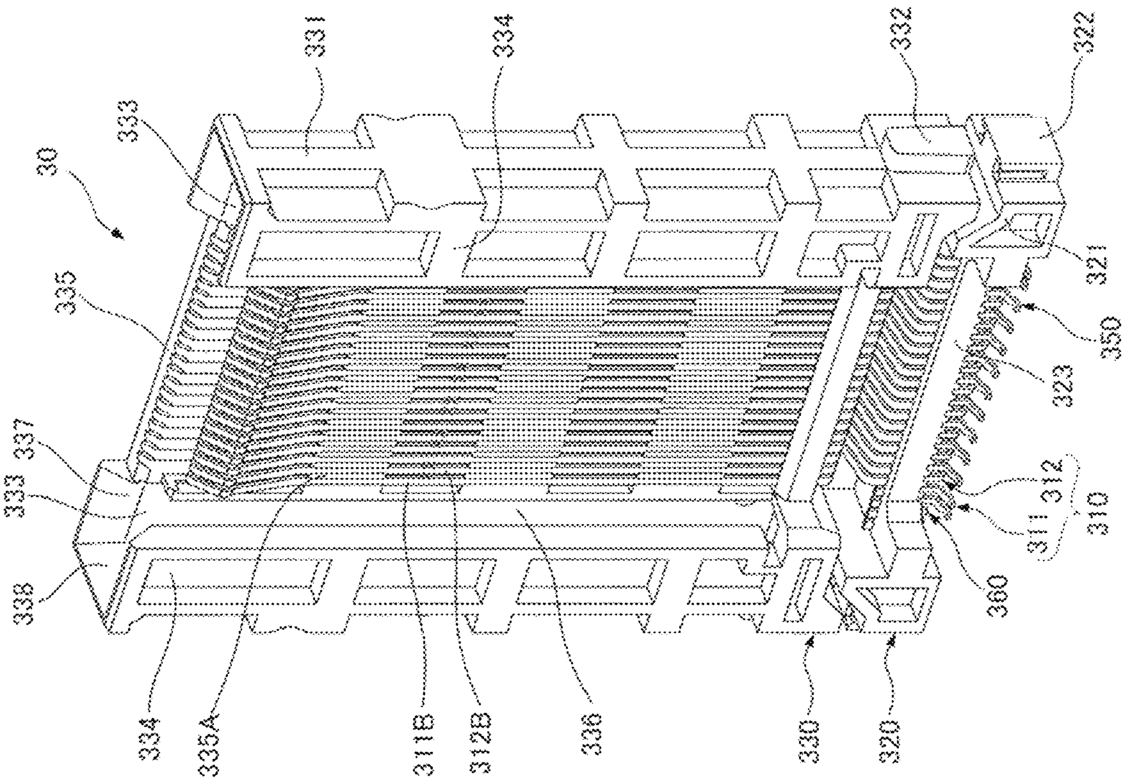

FIG. 7 (A, B) is a perspective view of a singular high-density socket connector 30, wherein FIG. 7 (A) illustrates a state viewed from one side (X2 side) in the connector width direction, and FIG. 7 (B) a state viewed from the other side (X1 side) in the connector width direction. As shown in FIG. 7 (A, B), the high-density socket connector 30 has a plurality of metal high-density socket terminals 310, socket housings 320, 330 (the hereinafter described "stationary socket housing 320" and "movable socket housing 330") made of plastic material or another electrically insulating material that retain the plurality of high-density socket terminals 310, metal anchor fittings 350 and reinforcing fittings 360 retained in the stationary socket housing 320 (see FIG. 8 (A)).

Figure 8:
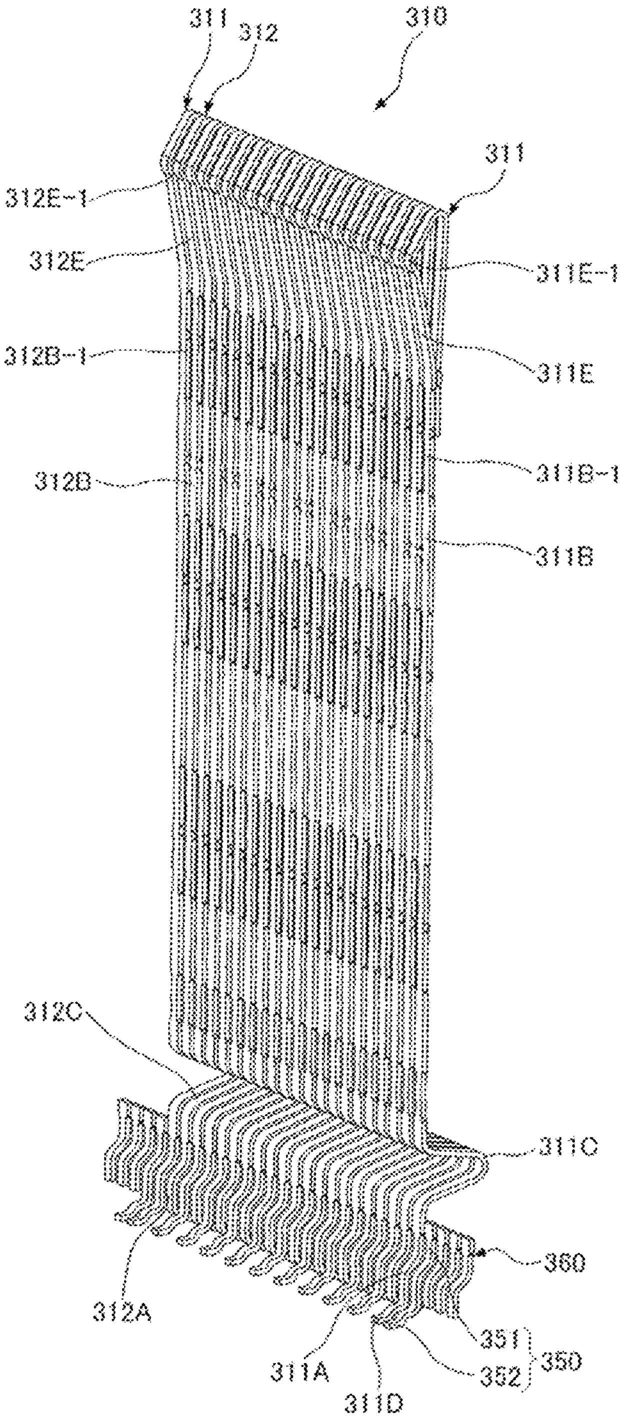
FIG. 8 (A) is a perspective view illustrating the high-density socket terminals and anchor fittings of the high-density socket connector illustrated in FIG. 7 (A), and FIG. 8 (B) is a lateral view of a row of high-density socket terminals.
Figure 8:
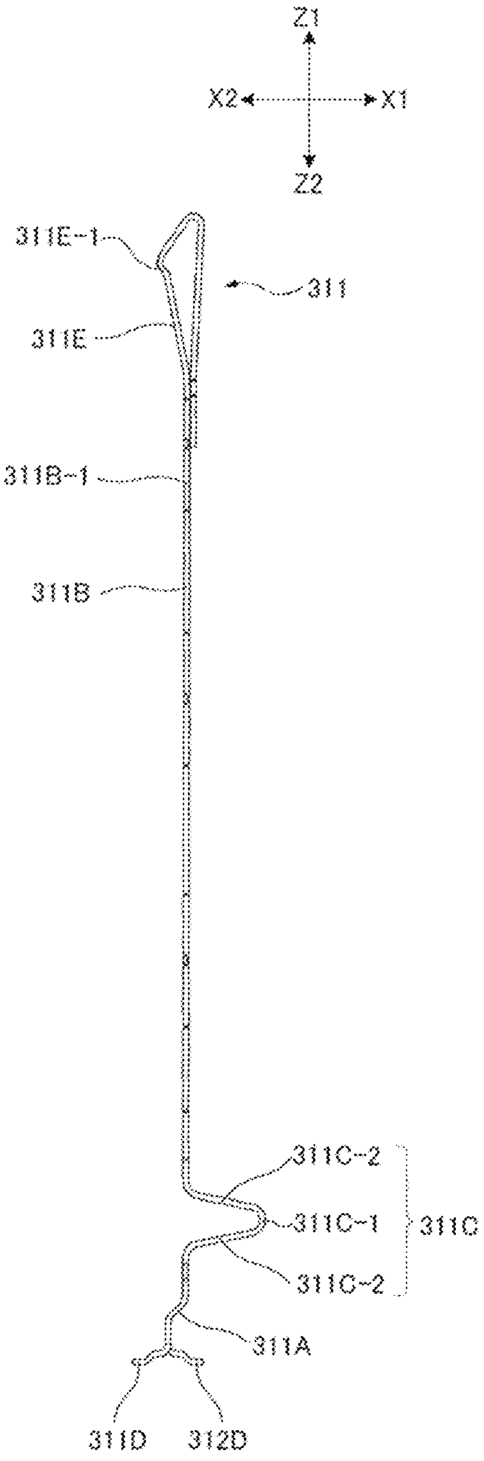

As shown in FIG. 7 (A) and FIG. 8 (A), the high-density socket terminals 310, which are formed thinner than the high-speed socket terminals 110 of the high-speed socket connector 10, have a greater number of terminals arranged side-by-side than the high-speed socket terminals 110. The high-density socket terminals 310, which are formed by bending a metal strip in the through-thickness direction, are disposed in an orientation that makes their terminal width direction coincide with the terminal array direction. As shown in FIG. 8 (A), the plurality of high-density socket terminals 310 include two types of terminals that differ in the orientation of extension of the connection portions, specifically, first high-density terminals 311 and second high-density terminals 312. In a row of high-density socket terminals 310, the first high-density terminals 311 and second high-density terminals 312 are disposed in an alternating manner.

As shown in FIG. 8 (A, B), the first high-density terminals 311 have a stationary-side retained portion 311A retained in the stationary socket housing 320, a movable-side retained portion (socket retained portion) 311B retained in the movable socket housing 330, a floating portion 311C located between the stationary-side retained portion 311A and the movable-side retained portion 311B, a connection portion 311D extending from the bottom end of the stationary-side retained portion 311A, and a resilient portion (socket resilient portion) 311E extending from the top end of the movable-side retained portion 311B.

As shown in FIG. 8 (A, B), the stationary-side retained portion 311A, which is generally crank-shaped when viewed in the terminal array direction (Y-axis direction), is embeddedly retained in the stationary socket housing 320 via integral molding. The movable-side retained portion 311B extends rectilinearly in the up-down direction. Narrowed-width portions 331B-1, whose terminal width dimensions (dimensions in the terminal array direction) are slightly smaller than those of other components forming part of the movable-side retained portion 311B, are formed in the up-down direction at multiple locations of the movable-side retained portion 311B, which is retained in the movable socket housing 330 via integral molding using the narrowed-width portions 311B-1. Although the narrowed-width portions 311B-1 are different from the narrowed-width portions 111B-1 of the high-speed signal terminals 111 as they are formed of a larger size in the up-down direction, the mode of retention by the movable socket housing 330 is identical to the mode of retention of the narrowed-width portions 111B-1 by the movable socket housing 130. The X2-side major faces of the movable-side retained portions 311B, which are exposed across the full extent thereof in the up-down direction, form contact surfaces capable of contacting the counterpart terminals provided in the counterpart connector combination 2.

The connection portion 311D, which is bent out at the bottom end of the stationary-side retained portion 311A and extends toward the X2 side in the connector array direction, has its bottom face solder connected to circuitry on the mounting face of the circuit board.

In the same manner as the floating portion 111C of the high-speed signal terminals 111, the floating portion 311C, which couples the top end of the stationary-side retained portion 311A and the bottom end of the movable-side retained portion 311B, has a generally recumbent U-shape that is convexly curved and bulges toward the X1 side in the connector width direction, i.e., the side opposite to the connection portion 311D in the connector width direction. The floating portion 311C is capable of resilient deformation in any direction, that is, in the connector width direction (X-axis direction), in the terminal array direction (Y-axis direction), and in the up-down direction (Z-axis direction). In addition, the floating portion 311C, which is formed of the same width dimensions throughout its entire length, is different from floating portion 111C in this respect.

The resilient portions 311E, which are not supported by the movable socket housing 330, are capable of resilient deformation in the through-thickness direction thereof. The X2-side major faces of the resilient portions 311E form contact surfaces capable of contacting the counterpart terminals provided in the counterpart connector combination 2. As shown in FIG. 8 (B), the resilient portion 311E, after extending from the top end of the movable-side retained portion 311B at a slight incline toward the X2 side as one moves upward and being subsequently bent and extending at an incline toward the X1 side as one moves upward, is further folded back at the top end and extends downward. A section bent to protrude on the X2 side is formed as a socket contact point portion 311E-1 capable of contacting a counterpart terminal. In addition, as shown in FIG. 8 (B), the distal end portion (free end portion) of the resilient portion 311E is in surface contact with the movable-side retained portion 311B from the X1 side.

As shown in FIG. 8 (B), the shape of the second high-density terminals 312 is only different from the first high-density terminals 311 in that the connection portion 312D is bent to extend toward the X1 side, with the rest of the shape being the same. In FIG. 8 (A, B), in the second high-density terminals 312, reference numerals obtained by adding "1" to the reference numerals used in the case of the first high-density terminals 311 are assigned to sections corresponding to the respective components of the first high-density terminals 311.

As shown in FIG. 7 (A, B), the stationary socket housing 320 is of substantially the same shape as the stationary socket housing 120 of the previously discussed high-speed socket connector 10 (see FIG. 3 (A, B)). Here, with regard to the stationary socket housing 320, reference numerals obtained by adding "200" to the reference numerals used in the case of the stationary socket housing 120 are assigned to sections corresponding to the respective components of the stationary socket housing 120, and further description thereof is omitted.

As shown in FIG. 7 (A, B), the movable socket housing 330 is of substantially the same shape as the movable socket housing 130 of the previously discussed high-speed socket connector 10 (see FIG. 3 (A, B)), with the exception that the protrusions 335A retaining the movable-side retained portions 311B, 312B of the high-density socket terminals 310 are formed of a larger size in the up-down direction. In FIG. 7 (A, B), with regard to the movable socket housing 330, reference numerals obtained by adding "200" to the reference numerals used in the case of the movable socket housing 130 are assigned to sections corresponding to the respective components of the movable socket housing 130. As shown in FIG. 7 (B), in the movable socket housing 330, in which window portions 335B disposed in the connector width direction are also formed between every two adjacent extended portions 335 in the same manner as in the previously discussed movable socket housing 130, the movable-side retained portions 311B, 312B of the high-density socket terminals 310 are exposed from within the movable socket housing 330 toward the X1 side through the window portions 335B.

As shown in FIG. 8 (A), one anchor fitting 350, formed by bending a metal strip-like piece in the through-thickness direction, is provided on each external side of the terminal array range of the high-density socket terminals 310 adjacently to said high-density socket terminals 310. The anchor fittings 350 are of the same shape as the stationary-side retained portions 311A and connection portions 311D of the first high-density terminals 311. Specifically, they have retained portions 351 bent in a substantially crank-like configuration, and anchoring portions 352, which are bent in a substantially crank-like configuration and extend in the X2 direction from the bottom ends of the retained portions 351. The anchor fittings 350, which are disposed in alignment with the stationary-side retained portions 311A and connection portions 311D, are embeddedly retained in the stationary-side end wall portions 321 of the stationary socket housing 320 via integral molding using the retained portions 351 while their anchoring portions 352 are secured to the corresponding portions of the circuit board via solder connections.

As shown in FIG. 8 (A), three reinforcing fittings 360, which are formed by bending a metal strip-like piece in the through-thickness direction, are provided adjacent the anchor fittings 350 outwardly of said anchor fittings 350 in the terminal array direction. The reinforcing fittings 360 are of the same shape as the stationary-side retained portions 311A of the first high-density terminals 311. The reinforcing fittings 360, which are disposed in alignment with the stationary-side retained portions 311A and retained portions 351, are embeddedly retained in the stationary-side end wall portions 321 of the stationary socket housing 320 via integral molding.

Figure 9:
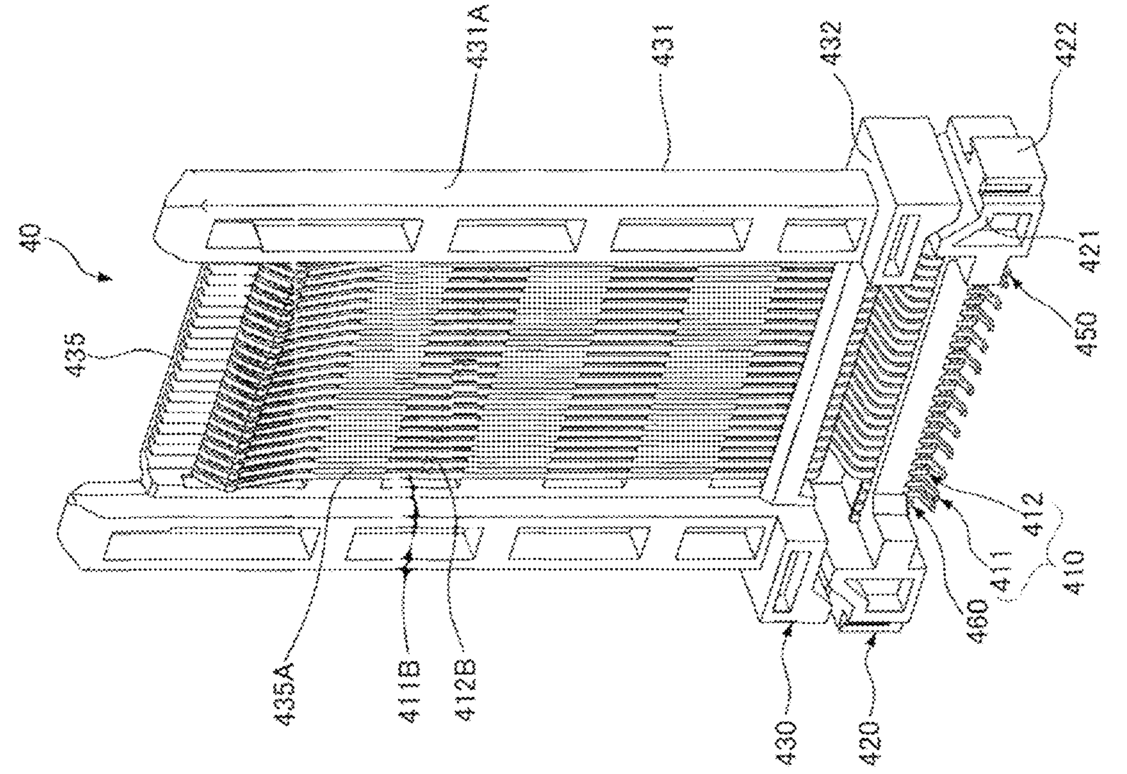
FIGS. 9 (A) and 9 (B) are perspective views of a singular high-density plug connector, wherein FIG. 9 (A) illustrates a state viewed from one side in the connector width direction, and FIG. 9 (B) a state viewed from the other side in the connector width direction.
Figure 9:
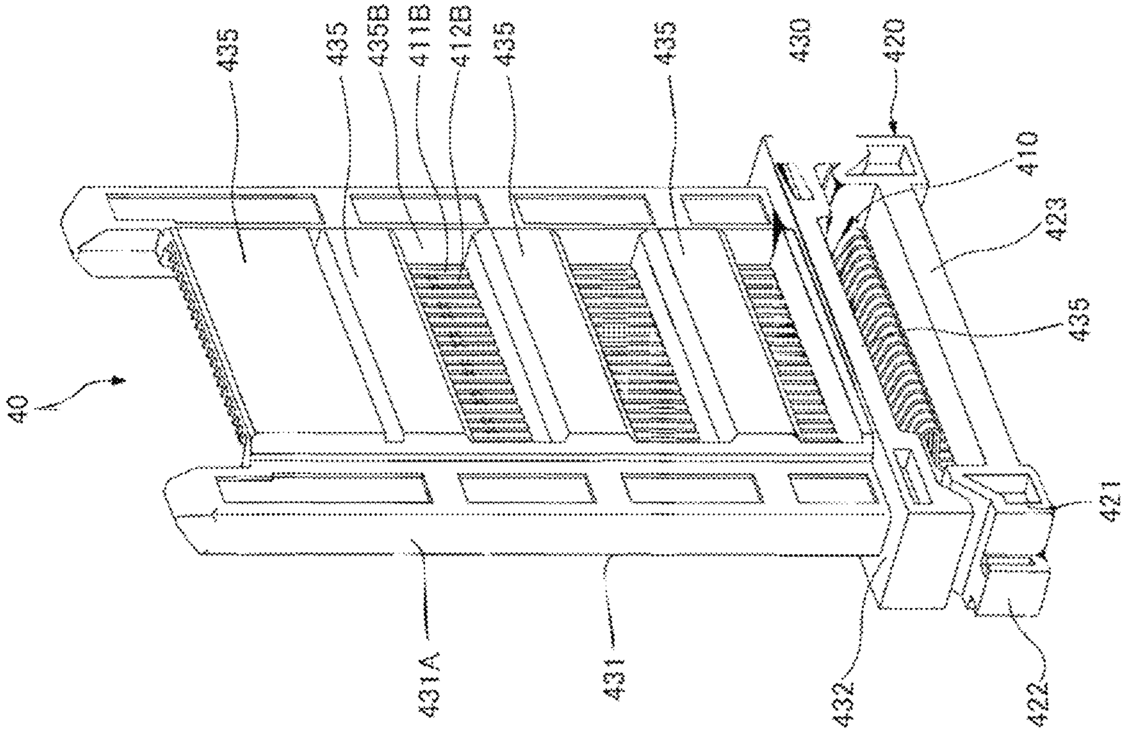

FIG. 9 (A, B) is a perspective view of a singular high-density plug connector 40, wherein FIG. 9 (A) illustrates a state viewed from one side (X2 side) in the connector width direction, and FIG. 9 (B) a state viewed from the other side (X1 side) in the connector width direction. In FIG. 9 (A, B), reference numerals obtained by adding "100" to the reference numerals used in the case of the high-density socket connector 30 are assigned to the sections corresponding to the high-density socket connector 30. The high-density plug connector 40 has high-density plug terminals 410, plug housings 420, 430 (a "stationary plug housing 420" and a "movable plug housing 430"), anchor fittings 450, and reinforcing fittings 460.

The high-density plug connector 40 is connectable to a high-density socket connector 1030 serving as a counterpart connector provided in the counterpart connector combination 2 by plugging into the receiving space of said high-density socket connector 1030. The high-density plug connector 40 differs from the high-density socket connector 30 in the shape of the movable plug housing 430. The high-density plug connector 40 will be discussed herein with emphasis on the configuration of the movable plug housing 430. In addition, since the high-density plug terminals 410, stationary plug housing 420, anchor fittings 450, and reinforcing fittings 460 of the high-density plug connector 40 are identical in shape, respectively, to the high-density socket terminals 310, stationary socket housing 320, anchor fittings 350, and reinforcing fittings 360 of the high-density socket connector 30, a description thereof is omitted herein.

As shown in FIG. 9 (A, B), the movable plug housing 430 is of substantially the same shape as the movable plug housing 230 of the previously discussed high-speed plug connector 20 (see FIG. 6 (A, B)), with the exception that the protrusions 435A retaining the high-density plug terminals 410 are formed of a larger size in the up-down direction. In FIG. 9 (A, B), with regard to the movable plug housing 430, reference numerals obtained by adding "200" to the reference numerals used in the case of the movable plug housing 230 are assigned to sections corresponding to the respective components of the movable plug housing 230, and further description thereof is omitted. In addition, as shown in FIG. 9 (B), in the movable plug housing 430, in which window portions 435B disposed in the connector width direction are also formed between every two adjacent extended portions 435 in the same manner as in the previously discussed movable socket housing 330 (see FIG. 7 (B)), the movable-side retained portions 411B, 412B of the high-density plug terminals 410 are exposed from within the movable plug housing 430 toward the X1 side through the window portions 435B.

Figure 10:
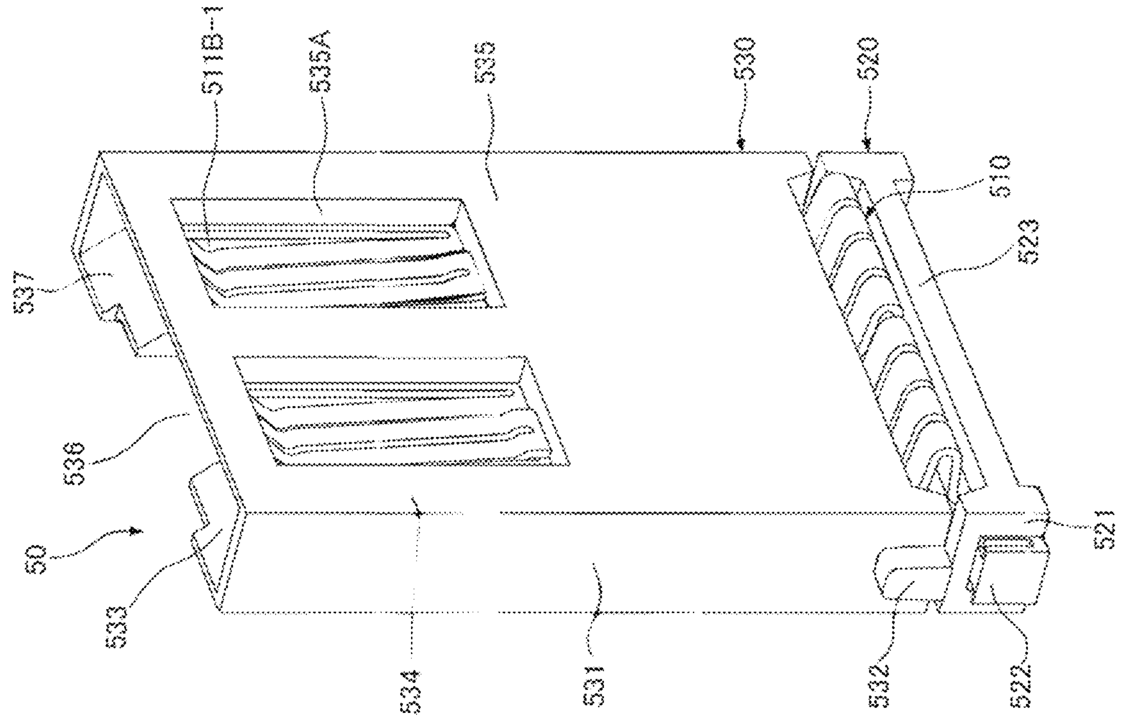
FIGS. 10 (A) and 10 (B) illustrate perspective views of a singular power supply socket connector, wherein FIG. 10 (A) illustrates a state viewed from one side in the connector width direction, and FIG. 10 (B) a state viewed from the other side in the connector width direction.
Figure 10:
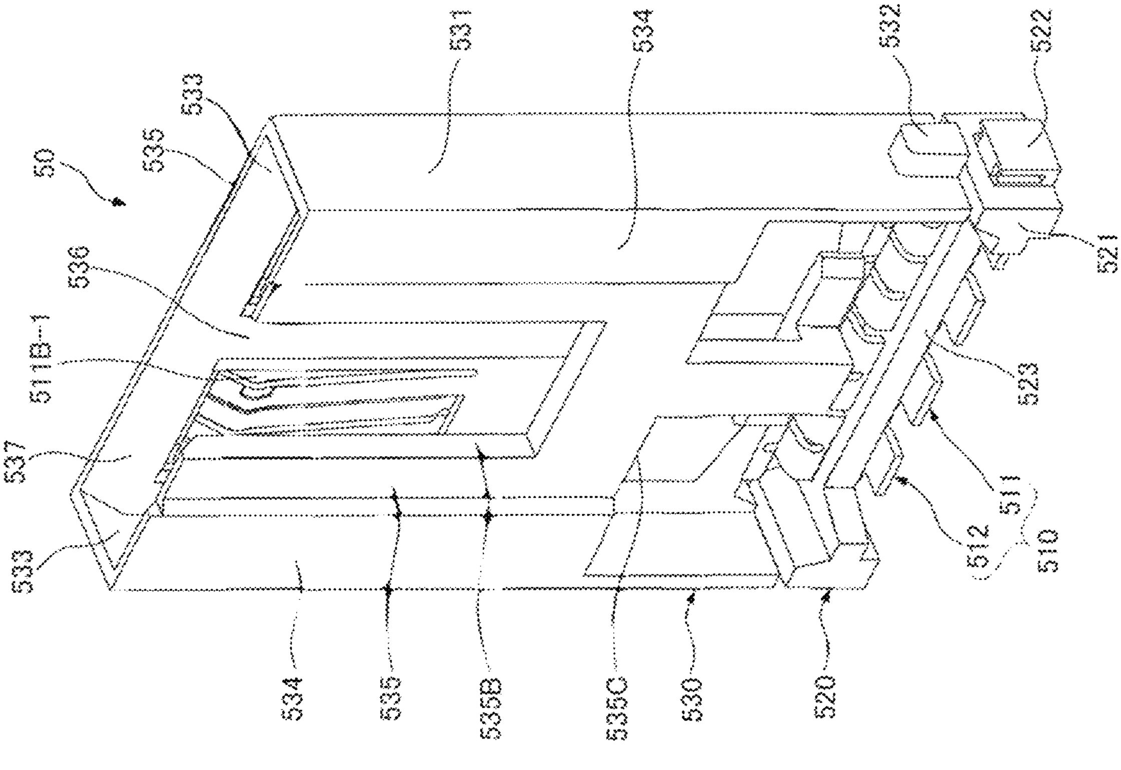

FIG. 10 (A, B) is a perspective view of a singular power supply socket connector 50, wherein FIG. 10 (A) illustrates a state viewed from one side (X2 side) in the connector width direction, and FIG. 10 (B) a state viewed from the other side (X1 side) in the connector width direction. As shown in FIG. 10 (A, B), the power supply socket connector 50 has a plurality of metal power supply socket terminals 510, and socket housings 520, 530 (the hereinafter described "stationary socket housing 520" and "movable socket housing 530") made of plastic material or another electrically insulating material that retain the plurality of power supply socket terminals 510.

The power supply socket terminals 510, which are formed by bending a sheet metal member in the through-thickness direction, are disposed in an orientation that makes their terminal width direction coincide with the terminal array direction. As shown in FIG. 10 (A, B), the plurality of power supply socket terminals 510 have first power supply terminals 511 and second power supply terminals 512, which differ from each other in shape, with two of each kind provided (see also FIG. 11 (A, B)).

Figure 11:
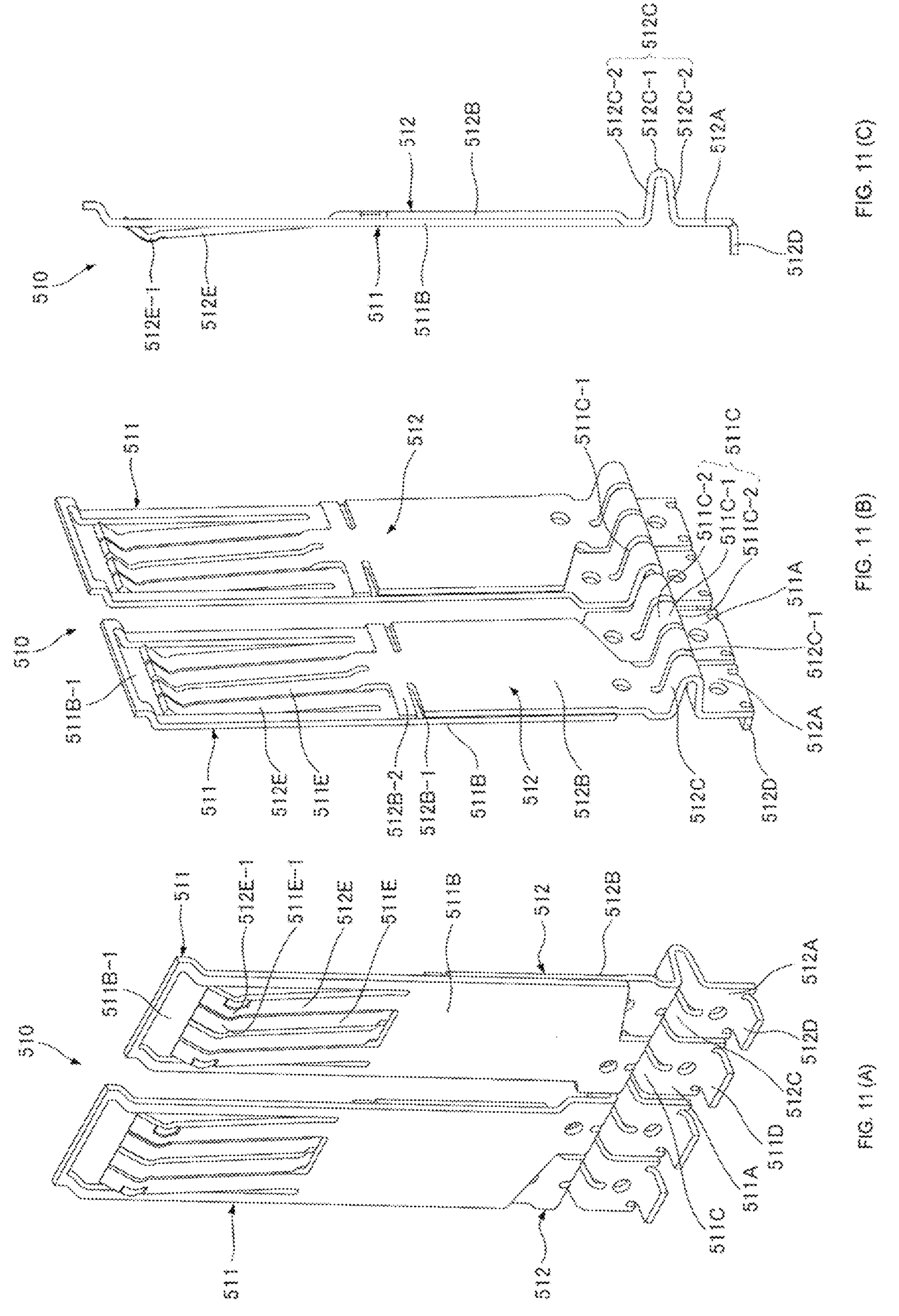
FIGS. 11 (A) to 11 (C) are views illustrating the power supply socket terminals of the power supply socket connector, wherein FIG. 11 (A) is a perspective view of a state viewed from one side in the connector width direction, FIG. 11 (B) is a perspective view of a state viewed from the other side in the connector width direction, and FIG. 11 (C) is a lateral view.

As shown in FIG. 11 (A, B), the first power supply terminals 511 have a stationary-side retained portion 511A retained in the stationary socket housing 520, a movable-side retained portion (socket retained portion) 511B retained in the movable socket housing 530, a floating portion 511C located between the stationary-side retained portion 511A and the movable-side retained portion 511B, a connection portion 511D extending from the bottom end of the stationary-side retained portion 511A, and resilient portions (socket resilient portions) 511E extending from the movable-side retained portion 511B.

As shown in FIG. 11 (A-C), the stationary-side retained portion 511A, which has a rectilinear configuration extending in the up-down direction, is embeddedly retained in the stationary socket housing 520 via integral molding. The movable-side retained portion 511B, which is formed of a larger size than the stationary-side retained portion 511A, floating portion 511C, and connection portion 511D in the terminal array direction (Y-axis direction), has a portion thereof located outwardly of the stationary-side retained portion 511A, floating portion 511C, and connection portion 511D in the terminal array direction. In approximately the top half of the movable-side retained portion 511B, there is formed a generally quadrangular window portion 511B-1 disposed in the through-thickness direction thereof. The movable-side retained portions 511B are embeddedly retained in the movable socket housing 530 via integral molding using the peripheral edges thereof. In addition, the X2-side major faces of the movable-side retained portions 511B exposed from within the movable socket housing 530 form contact surfaces capable of contacting the counterpart terminals provided in the counterpart connector combination 2.

The connection portion 511D, which is formed of a smaller size than the stationary-side retained portion 511A in the terminal array direction, is bent out at the bottom end of the stationary-side retained portion 511A and extends in the connector width direction (X-axis direction) toward the X2 side, with the bottom face thereof solder connected to circuitry on the mounting face of the circuit board.

In the same manner as the floating portion 111C of the high-speed signal terminals 111, the floating portion 511C, which couples the top end of the stationary-side retained portion 511A and the bottom end of the movable-side retained portion 511B, has a generally recumbent U-shape that is convexly curved and bulges toward the X1 side in the connector width direction, i.e., the side opposite to the connection portion 511D in the connector width direction. The floating portion 511C, which is larger than the floating portion 111C of the high-speed socket terminals 110 and the floating portion 311C of the high-density socket terminals

310 in the terminal array direction, is formed of the same width dimensions throughout its entire length.

The floating portion 511C is capable of resilient deformation in any direction, i.e., in the connector width direction (X-axis direction), in the terminal array direction (Y-axis direction), and in the up-down direction (Z-axis direction). In addition, midway through the floating portion 511C in the terminal array direction, there is formed a slit-shaped long hole portion 511C-1 extending throughout the entire longitudinal extent of said floating portion 511C. With the long hole portion 511C-1 being formed in this manner, the floating portion 511C is rendered more likely to undergo resilient deformation.

The resilient portions 511E, which are not supported by the movable socket housing 530, are capable of resilient deformation in the through-thickness direction thereof. The X2-side major faces of the resilient portions 511E form contact surfaces capable of contacting the counterpart terminals provided in the counterpart connector combination 2. In the present embodiment, two resilient portions 511E extend upward from the bottom edges of the window portions 511B-1 of the movable-side retained portions 511B. Specifically, as shown in FIG. 11 (A-C), the respective resilient portions 511E extend at outboard locations in the terminal array direction from the bottom edge of the window portion 511B-1 at a slight incline toward the X2 side as one moves upward and are subsequently bent and extend at an incline toward the X1 side as one moves upward. The bent sections, i.e., the sections protruding on the X2 side, are formed as socket contact point portions 511E-1 capable of contacting the counterpart terminals.

In the present embodiment, two resilient portions 511E are provided at locations symmetric about the center of the first power supply terminals 511 in the terminal width direction (Y-axis direction). Accordingly, when the respective resilient portions 511E are subjected to a pressure force directed in the X1 direction as a result of contact with the counterpart terminals once the connectors are matingly connected, the pressure force acts in a uniform manner at the aforementioned centrally symmetric locations. As a result, since there are no external forces acting to rotate the first power supply terminals 511 about axes extending through said first power supply terminals 511 in the up-down direction, it becomes easier to maintain said first power supply terminals 511 in standard orientation.

As shown in FIG. 11 (A, B), the second power supply terminals 512 have a stationary-side retained portion 512A retained in the stationary socket housing 520, a movable-side retained portion 512B retained in the movable socket housing 530, a floating portion 512C located between the stationary-side retained portion 512A and the movable-side retained portion 512B, a connection portion 512D extending from the bottom end of the stationary-side retained portion 512A, and resilient portions 512E extending from the movable-side retained portion 512B. Reference numerals obtained by adding "1" to the reference numerals of the corresponding sections in the first power supply terminals 511 are assigned to the respective components of the second power supply terminals 512.

The stationary-side retained portion 512A, floating portion 512C, and connection portion 512D, which are of substantially the same shape as the stationary-side retained portion 511A, floating portion 511C, and connection portion 511D of the first power supply terminals 511, are located outwardly of the stationary-side retained portion 511A, floating portion 511C, and connection portion 511D in the terminal array direction. The movable-side retained portion 512B differs in shape from the movable-side retained portion 511B of the first power supply terminals 511. In addition, while the resilient portions 512E are of substantially the same shape as the resilient portions 511E of the first power supply terminals 511, they differ in terms of position in the terminal array direction.

The movable-side retained portion 512B, which is formed of a larger size than the stationary-side retained portion 512A, floating portion 512C, and connection portion 512D in the terminal array direction, has a portion thereof located inwardly of the stationary-side retained portion 512A, floating portion 512C, and connection portion 512D in the terminal array direction. In addition, the movable-side retained portion 512B, which is formed within the same range as the movable-side retained portion 511B of the first power supply terminals 511 in the terminal array direction and, in addition, within a range corresponding to substantially the bottom half of the movable-side retained portion 511B in the up-down direction, is disposed in superposition on the movable-side retained portion 511B from the X1 side.

As shown in FIG. 11 (B), notch portions 512B-1 extending inwardly from the opposite lateral edges (edges extending in the up-down direction) in the terminal array direction are formed in the top portion of the movable-side retained portion 512B, and contact pieces 512B-2 capable of resilient deformation in the through-thickness direction thereof are provided above said notch portions 512B-1. The contact pieces 512B-2, which extend at a slight incline toward the X2 side in the through-thickness direction thereof, make contact with the major face of the top portion of the movable-side retained portion 511B under contact pressure from the X1 side when the movable-side retained portion 512B is superimposed on the movable-side retained portion 511B, which places the first power supply terminal 511 and the second power supply terminal 512 in electrical communication. Sections other than the top portion of the movable-side retained portion 512B, that is, sections located below the notch portions 512B-1, may be located with a slight gap formed relative to the movable-side retained portion 511B and, also, may be in contact with the movable-side retained portion 511B.

The resilient portions 512E, which are of the same shape as the resilient portions 511E of the first power supply terminals 511 and are not supported by the movable socket housing 530, are capable of resilient deformation in the through-thickness direction thereof. In the present embodiment, as shown in FIG. 11 (A, B), with the two resilient portions 512E being adjacent to each other, two resilient portions 511E extend upward from the bottom edge of the window portion 511B-1 of the stationary-side retained portion 511A at locations between the two resilient portions 511E in the terminal array direction. As shown in FIG. 11 (A), the socket contact point portions 512E-1 of the resilient portions 512E are located at the same height as the socket contact point portions 511E-1 of the resilient portions 511E in the up-down direction. In addition, as a result bending in a crank-like configuration in the bottom end portions thereof, the resilient portions 512E are provided in the same position as the resilient portions 511E of the first power supply terminals 511 when viewed in the terminal array direction.

In the present embodiment, two resilient portions 512E are provided at locations symmetric about the center of the second power supply terminals 512 in the terminal width direction (Y-axis direction). Accordingly, in the same manner as described previously with regard to the resilient portions 511E of the first power supply terminals 511, once the connectors are matingly connected, it becomes easier to maintain the second power supply terminals 512 in standard orientation.

As discussed previously, the floating portions 512C are of the same shape as the floating portions 511C of the first power supply terminals 511, and, when viewed in the terminal array direction, are provided in the same position as the floating portions 511C of the first power supply terminals 511 because the bottom end portions of the movable-side retained portions 511B are bent in a crank-like configuration. In this manner, when viewed in the terminal array direction, the floating portions 511C, 512C are provided in the same position, thereby rendering the floating portions 511C, 512C more likely to undergo resilient deformation.

In the present embodiment, as shown in FIG. 11 (A, B), the two adjacent movable-side retained portions 511B, as well as the two adjacent movable-side retained portions 512B, are located with a large gap in the terminal array direction provided therebetween throughout the vertical range thereof with the exception of the bottom end portions. Specifically, this gap is larger than the gaps formed respectively between two adjacent stationary-side retained portions 511A, the bottom end portions of the movable-side retained portions 511B, and the floating portions 511C.

In the present embodiment, because a large gap is formed in this manner between sections of the movable-side retained portions 511B, with the exception of the bottom end portions, and between sections of the movable-side retained portions 512B, with the exception of the bottom end portions, once the connectors are matingly connected, it becomes easy to prevent counterpart terminals (power supply plug terminals) from making contact with the power supply socket terminals 510 on the side that should not be in contact, even if the counterpart connector, i.e., the power supply plug connector 1060, is offset from the standard position in the terminal array direction (Y-axis direction). Specifically, when the counterpart connector is offset in the terminal array direction toward the Y1 side, the counterpart terminals located on the Y2 side can be prevented from making contact with the power supply socket terminals 510 located on the Y1 side and, in addition, when the counterpart connector is offset in the terminal array direction toward the Y2 side, the counterpart terminals located on the Y1 side can be prevented from making contact with the power supply socket terminals 510 located on the Y2 side.

As shown in FIG. 10 (A, B), the stationary socket housing 520 is of substantially the same shape as the stationary socket housing 120 of the previously discussed high-speed socket connector 10 (see FIG. 3 (A, B)), or the stationary socket housing 320 of the high-density socket connector 30 (see FIG. 7 (A, B)). Here, with regard to the stationary socket housing 520, reference numerals obtained by adding "200" to the reference numerals used in the case of the stationary socket housing 320 are assigned to sections corresponding to the respective components of the stationary socket housing 320, and further description thereof is omitted.

As shown in FIG. 10 (A, B), the movable socket housing 530, in which movable-side lateral wall portions 535 positioned sandwiching a receiving space 536 are formed on the opposite sides (the X1 and X2 sides) in the connector width direction (X-axis direction), differs in this respect from the stationary socket housing 120 of the previously discussed high-speed socket connector 10 (see FIG. 3 (A, B)), or the stationary socket housing 320 of the high-density socket connector 30 (see FIG. 7 (A, B)). Two window portions 535A disposed through the movable-side lateral wall portion 535 are formed in the movable-side lateral wall portion 535 on the X1 side in areas corresponding to the window portions 511B-1 of the movable-side retained portions 511B. In addition, the movable-side lateral wall portion 535 on the X2 side has an upper notched portion 535B formed in the central region of approximately the top half in the terminal array direction, and one lower notched portion 535C is formed in each of two regions located on the opposite sides of approximately the bottom half in the terminal array direction. Accordingly, the movable-side lateral wall portion 535 on the X2 side is open in the connector width direction at the locations of the upper notched portion 535B and lower notched portions 535C (see FIG. 10 (A)).

In addition, inclined faces 537 for guiding the movable plug housing of the counterpart connector (plug power supply connector 1060) into the receiving space 536 are formed in the top end portion of the movable socket housing 530 in a range comprising the movable-side lateral wall portions 535 and movable-side end wall portions 531 in the terminal array direction. Specifically, the inclined faces 537, which are inclined toward the receiving space 536 in the connector width direction (X-axis direction) as one moves downward, guide the movable plug housing in the connector width direction.

In addition, lateral interior wall surfaces in the top portion of the movable-side end wall portions 531 (surfaces transverse to the terminal array direction) extend without tilting relative to the up-down direction. That is to say, no inclined faces for guiding the movable plug housing of the counterpart connector (plug power supply connector 1060) in the terminal array direction are formed in the top portions of the movable-side end wall portions 531, and in this respect the housing differs from the movable socket housings 130, 330, in which inclined faces 138, 338 are formed (see FIG. 3 (A, B) and FIG. 7 (A, B)). As a result, the receiving space 536 is formed of a larger size in the terminal array direction than the receiving spaces 136, 336 of the movable socket housings 130, 330. Accordingly, even if, during connector mating, mating is performed with the counterpart connector offset from the standard position in the terminal array direction, said counterpart connector can enter the receiving space 536 as is.

In addition, the shape of the other sections forming part of the movable socket housing 530 is substantially the same as that of the movable socket housing 130 of the previously discussed high-speed socket connector 10 or in the movable socket housing 330 of the high-density socket connector 30. Here, with regard to the shape of the other sections in the movable socket housing 530, reference numerals obtained by adding "200" to the reference numerals used in the case of the movable socket housing 330 are assigned to sections corresponding to the respective components of the movable socket housing 330, and further description thereof is omitted.

In the present embodiment, two resilient portions 511E and two resilient portions 512E forming part of the socket power supply terminals 510 are provided at locations symmetric about the center location of the socket power supply terminals 510. However, as long as a configuration is ensured wherein the socket power supply terminals 510 can be easily maintained in standard orientation when placed in contact with the counterpart terminals, it is not essential for the resilient portions 511E, 512E to be at the above-described symmetric locations. In such a case, for example, the resilient portions 511E and the resilient portions 512E may be disposed in an alternating fashion. Disposing the resilient portions 511E and resilient portions 512E alternatingly in this manner can reduce the spacing between neighboring resilient portions in the terminal array direction and, as a result, can make the socket power supply terminals more compact in the terminal array direction.

In the present embodiment, as shown in FIG. 11 (A, B), in the two first power supply terminals 511, the stationary-side retained portion 511A, the bottom end portion of the movable-side retained portion 511B, the floating portion 511C, and the connection portion 511D are provided at locations inboard of the center of the first power supply terminal 511 in the terminal array direction. In addition, in the two second power supply terminals 512, the stationary-side retained portion 512A, the bottom end portion of the movable-side retained portion 512B, the floating portion 512C, and the connection portion 511D are provided at locations outboard of the center of the second power supply terminal 512 in the terminal array direction.

As a variation thereof, for example, the stationary-side retained portion, the bottom end portion of the movable-side retained portion, the floating portion, and the connection portion in respective first power supply terminals may be provided at locations offset from the center toward one side in the terminal array direction while providing the stationary-side retained portion, the bottom end portion of the movable-side retained portion, the floating portion, and the connection portion in respective second power supply terminals at locations offset from the center toward the other side in the terminal array direction. With such a configuration, a pair of two first power supply terminals can be made of the same shape while making a pair of two second power supply terminals of the same shape, thereby allowing for the number of parts to be reduced.

The power supply plug connector 60 is connectable to a power supply socket connector 1050 serving as a counterpart connector provided in the counterpart connector combination 2 by plugging into the receiving space 536 of said power supply socket connector 1050. The power supply plug connector 60 differs from the power supply socket connector 50 in the shape of the movable plug housing 630. The power supply plug connector 60 will be discussed herein with emphasis on the configuration of the movable plug housing 630. In addition, since the power supply plug terminals 610 and stationary plug housing 620 of the power supply plug connector 60 are identical in shape, respectively, to the power supply socket terminals 510 and stationary socket housing 520 of the power supply socket connector 50, a description thereof is omitted herein.

Figure 12:
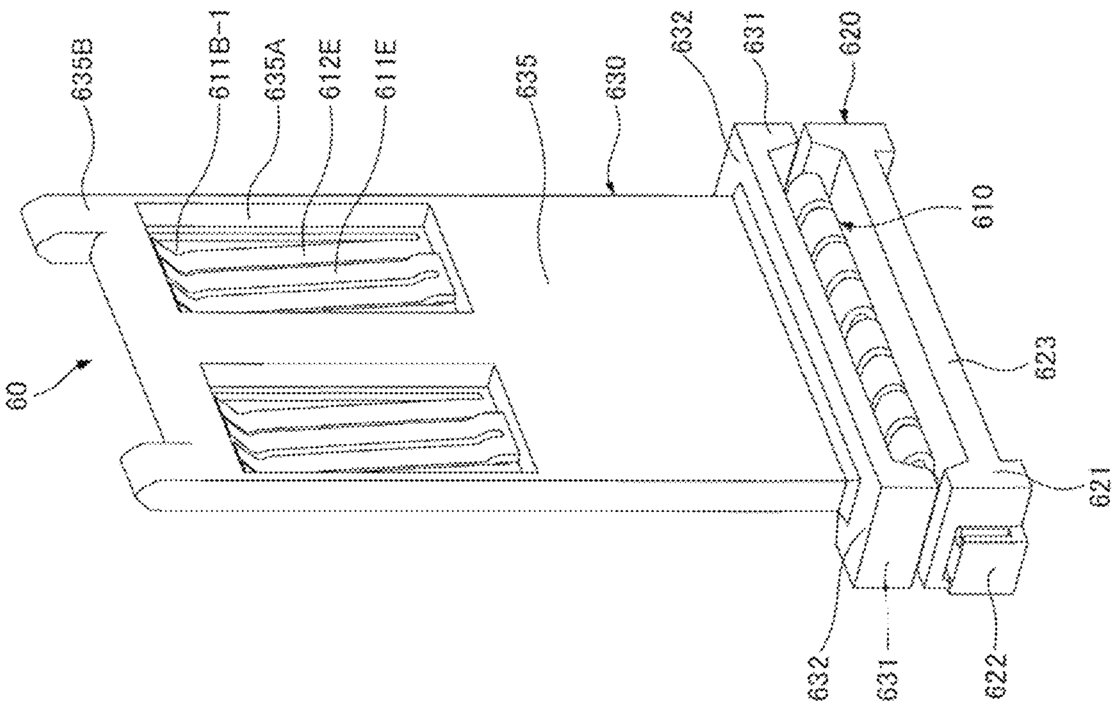
FIGS. 12 (A) and 12 (B) are perspective views of a singular power supply plug connector, in which FIG. 12 (A) illustrates a state viewed from one side in the connector width direction, and FIG. 12 (B) a state viewed from the other side in the connector width direction.
Figure 12:
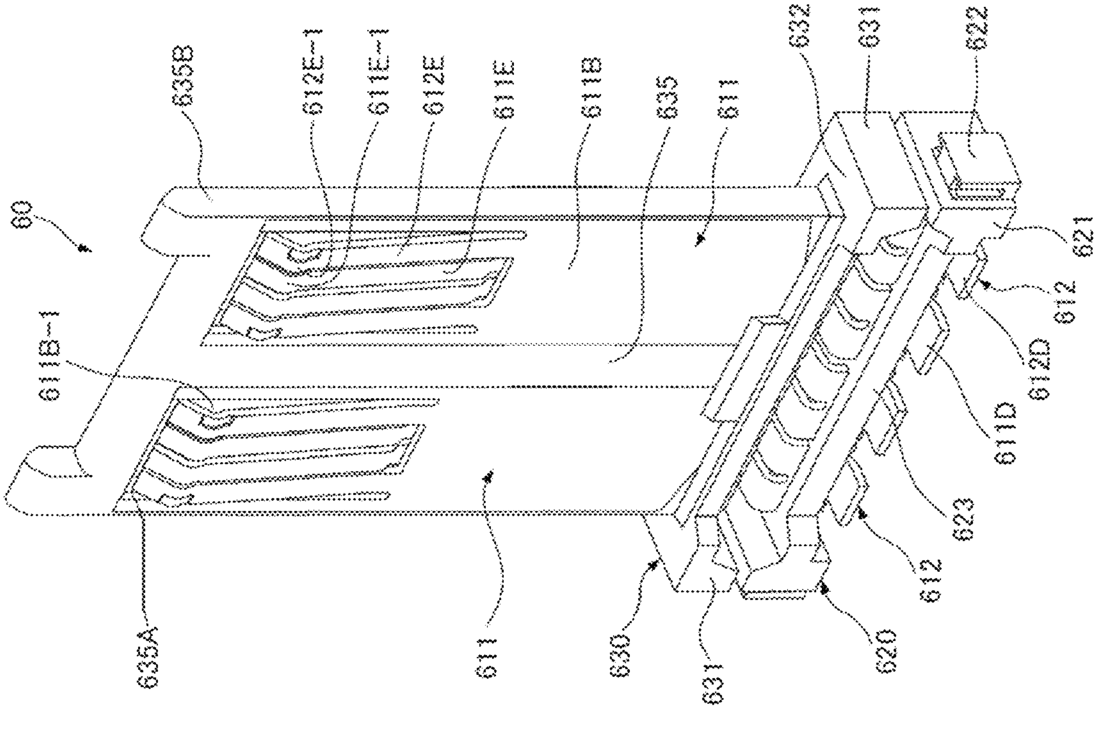

As shown in FIG. 12 (A, B), the movable plug housing 630 has movable-side end wall portions 631 provided at the opposite ends in the terminal array direction in the bottom portion of said movable plug housing 630, and a movable-side retaining portion 635 of a generally quadrangular plate-like configuration that couples these movable-side end wall portions 631 while extending in the up-down direction.

In the movable-side end wall portions 631, the outward end portions in the terminal array direction, i.e., the sections located outwardly of the movable-side retaining portion 635, constitute restricted portions 632. When the movable plug housing 630 is attached to the coupling member 70, the restricted portions 632 are adapted to be located directly below the hereinafter described plug restricting portions 73C of the coupling member 70 and be restricted in upwardly directed motion by said plug restricting portions 73C.

The movable-side retaining portion 635 retains the power supply plug terminals 610 via integral molding. Window portions 635A disposed through the movable-side retaining portion 635 are formed in the movable-side retaining portion 635 in areas corresponding to window portions 611B-1 formed in the movable-side retained portions 611B of the power supply plug terminals 610 (see FIG. 12 (B)). As shown in FIG. 12 (A), in the movable-side retained portions 611B, the X2-side major faces of the sections other than the peripheral edges are exposed from within the movable-side retaining portion 635. In addition, as shown in FIG. 12 (A, B), resilient portions 611E, 612E are exposed from within the movable-side retaining portion 635 through the window portions 635A.

The opposite ends of the movable-side retaining portion 635 in the terminal array direction are formed as guided portions 635B extending in the up-down direction. In addition to entering the guiding portions 533 of the movable socket housing 530 and being guided in the up-down direction in the process of connector mating, the guided portions 635B have their exterior wall surfaces on the X2 side in the connector width direction adapted to be supported by the end supporting portions 534 of the movable socket housing 530 when the connectors are in a mated condition.

As shown in FIG. 2, the coupling member 70, which is made by stamping and bending a sheet metal member in the through-thickness direction, has two coupling portions 71 extending in the connector array direction (X-axis direction), bridging portions 74 linking the two coupling portions 71 together, and a plurality of anchoring portions 77 extending from the bottom end portion of each coupling portion 71. The coupling portions 71, which have their major faces at right angles to the terminal array direction (Y-axis direction), extend along the edges of the housings of the connectors 10-60 in the terminal array direction over a range comprising all the connectors 10-60 in the connector array direction. The coupling portions 71, which have socket retaining portions 72 positioned in alignment with socket connectors 10, 30, 50 in the connector array direction and plug retaining portions 73 positioned in alignment with plug connectors 20, 40, 60, have the socket retaining portions 72 and plug retaining portions 73 provided in an alternating manner.

Figure 13:
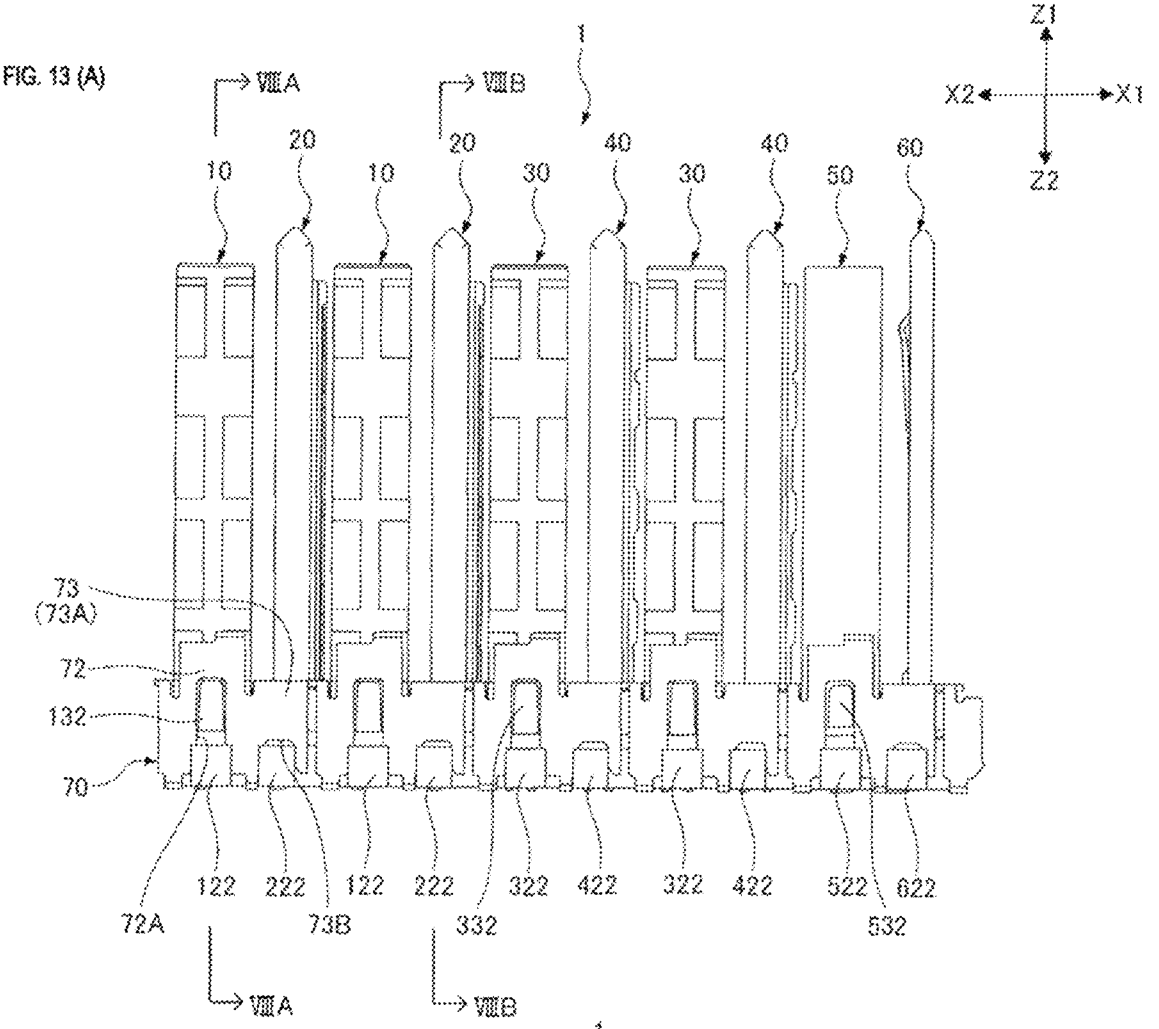
FIG. 13 (A) is a lateral view of the connector combination, and FIG. 13 (B) is an enlarged view illustrating part of the bottom portion of FIG. 13 (A) in enlarged detail.
Figure 13:
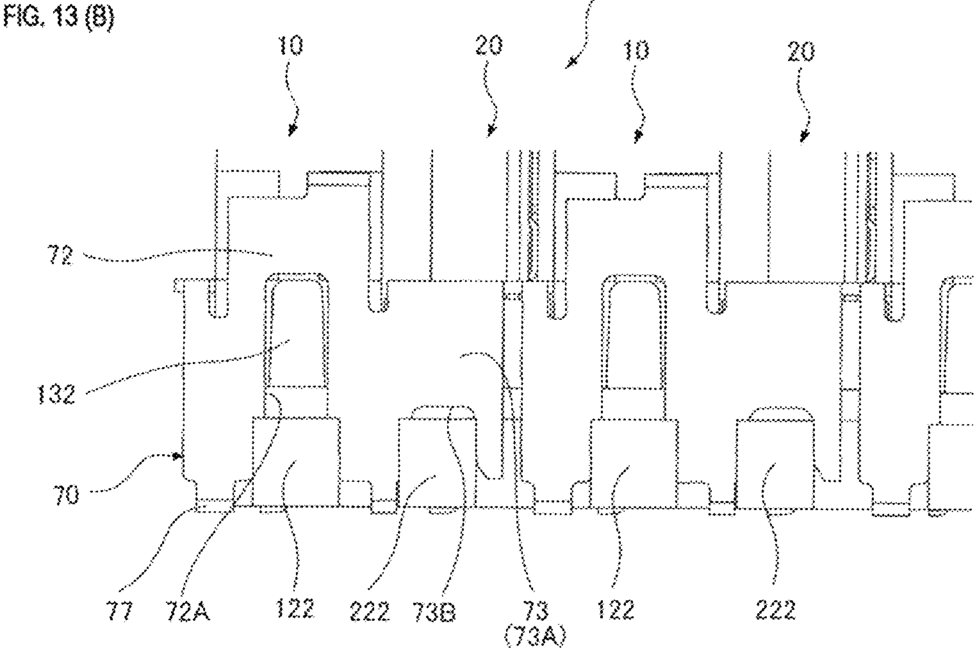

The socket retaining portions 72, which have a plate-like configuration whose major faces are perpendicular to the terminal array direction over the entire extent thereof, extend above the plug retaining portions 73. The socket retaining portions 72 have formed therein long groove portions 72A extending in the up-down direction and open at the bottom end while being sealed at the top end. As shown in FIG. 13 (A, B), the long groove portions 72A, along with press-fittingly retaining the press-fit portions 122, 322, 522 of the stationary socket housings 120, 320, 520 in the bottom portion thereof, are adapted to accommodate the restricted portions 132, 332, 532 of the movable socket housings 130, 330, 530 in the top portion thereof. The top portions of these long groove portions 72A serve as socket restricting portions that restrict the motion of the restricted portions 132, 332, 532 upward (Z1 direction) and in the connector array direction (X1 direction and X2 direction) with their inner edges (see also FIG. 14 (A)).

Due to the fact that in the present embodiment the socket retaining portions 72 with long groove portions 72A serving as socket restricting portions are formed in a plate-like configuration whose major faces are perpendicular to the terminal array direction over the entire extent thereof, the dimensions of the socket retaining portions 72 in the terminal array direction are their through-thickness dimensions. Therefore, an increase in size in the terminal array direction can be avoided in the socket retaining portions 72.

The plug retaining portions 73 have a short plate portion 73A having major faces perpendicular to the terminal array direction, and a plug restricting portion 73C that is bent at the top end of the short plate portion 73A and extends inwardly in the terminal array direction. The short plate portions 73A, which are formed of a smaller size than the socket retaining portions 72 in the up-down direction, have formed therein short groove portions 73B extending in the up-down direction and open at the bottom end while being sealed at the top end. The short groove portions 73B are formed of a shorter height in the up-down direction than the long groove portions 72A and, as shown in FIG. 13 (A, B), are adapted to press-fittingly retain the press-fit portions 222, 422, 622 of the stationary plug housings 220, 420, 620. The plug restricting portions 73C are adapted to restrict upward (Z1 direction) motion of the restricted portions 232, 432, 632 of the movable plug housings 230, 430, 630 (see FIG. 14 (B)).

As is shown in FIG. 2, the bridging portions 74 extend in the terminal array direction and couple the coupling portions 71 at multiple locations in the connector array direction, specifically, at locations on the opposite sides of each of the connectors 10-60. Slots 75, 76 capable of receiving the movable housings 130-630 of each of the connectors 10-60 from below are formed between two adjacent bridging portions 74 in the shape of long holes extending in the terminal array direction. Specifically, the slots 75, 76 include socket slots 75, which receive the movable socket housings 130, 330, 530, and plug slots 76, which receive the movable plug housings 230, 430, 630. The socket slots 75 and plug slots 76 are formed in an alternating manner in the connector array direction. In the present embodiment, the lateral edges (edges extending in the terminal array direction) of each bridging portion 74 forming the inner edges of each slot 75, 76 are abuttable against the movable housings 130-630 in the connector array direction and serve as restricting portions that restrict motion of the movable housings 130-630 in connector array direction beyond a predetermined amount.

As shown in FIG. 2, in the coupling portions 71, the socket retaining portions 72 are provided at locations corresponding to the socket slots 75 in the connector array direction, and the plug retaining portions 73 are provided at locations corresponding to the plug slots 76. In the present embodiment, because the plug restricting portions 73C, which extend inwardly of the socket retaining portions 72 in the terminal array direction, are formed in the plug retaining portions 73, the plug slots 76 are made smaller than the socket slots 75 in the terminal array direction in exact proportion to the plug restricting portions 73C.

The anchoring portions 77 are bent out at the bottom end of the coupling portions 71 at locations corresponding to the bridging portions 74 in the terminal array direction and extend outwardly in the terminal array direction. The anchoring portions 77 are adapted to be secured to the corresponding portions of the circuit board by soldering their bottom faces thereto. Thus, the motion of the restricted portions 132-632 of the movable housings 130-630 can be tightly restricted by securing the coupling member 70 to the circuit board using the anchoring portions 77.

The counterpart connector combination 2 is assembled by attaching the connectors 10-60 to the coupling member 70 from below as shown by the arrow in FIG. 2. Specifically, the press-fit portions 122, 322, 522 of the respective corresponding socket connectors 10, 30, 50 are press-fitted into the long groove portions 72A of the socket retaining portions 72 from below and, in addition, the press-fit portions 222, 422, 622 of the respective corresponding plug connectors 20, 40, 60 are press-fitted into the short groove portions 73B of the plug retaining portions 73 from below. As a result, the connectors 10-60 are retained in the coupling member 70 with the help of the press-fit portions 122-622, thereby completing the counterpart connector combination 2. At this time, the movable socket housings 130, 330, 530 of the socket connectors 10, 30, 50 are inserted into the respective corresponding socket slots 75 from below while the movable plug housings 230, 430, 630 of the plug connectors 20, 40, 60 are inserted into the respective corresponding plug slots 76 from below (see FIG. 1).

It should be noted that although in the present embodiment the connectors 10-60 of the connector combination 1 are arranged in the order illustrated in FIG. 1 and FIG. 2, it is not essential for them to be arranged in that order, and the order of arrangement of the connectors 10-60 can be set as appropriate depending on the design of the connector combination. In such a case, any of the socket connectors 10, 30, 50 are disposed in the socket slots 75, and any of the plug connectors 20, 40, 60 are disposed in the plug slots 76. At this time, the counterpart connectors 1010-1060 in the counterpart connector combination 2, which are matingly connectable to the connectors 10-60, are provided arranged in an order corresponding to the placement of the connectors 10-60 in the connector combination 1.

Figure 14B:
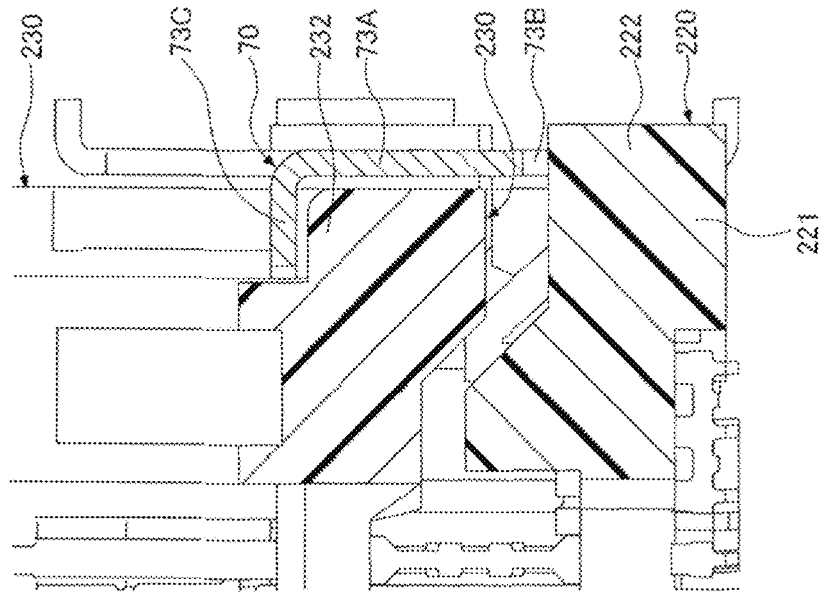
FIG. 14 (A) is a partial cross-sectional view illustrating the bottom portion of a cross-section taken along line XIIIA-XIIIA in FIG. 13 (A), and FIG. 14 (B) is a partial cross-sectional view illustrating the bottom portion of a cross-section taken along line XIIIB-XIIIB in FIG. 13 (B).
Figure 14A:
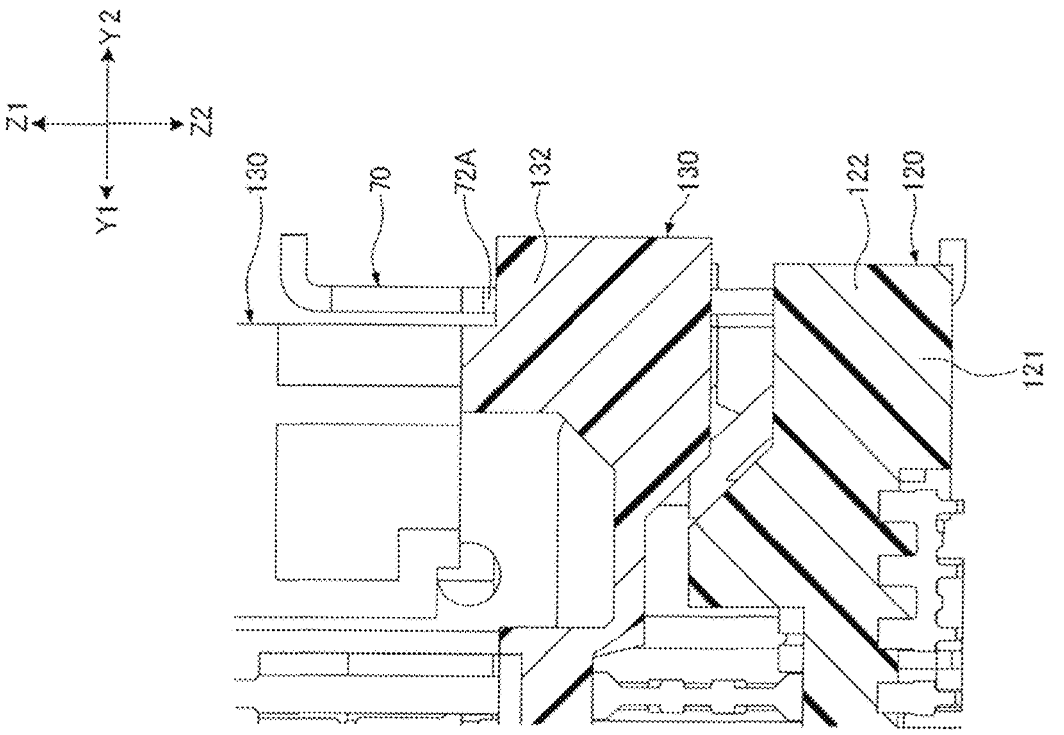

In addition, as shown in FIG. 13 (A, B), the restricted portions 132, 332, 532 of the respective corresponding socket connectors 10, 30, 50 are accommodated within the top portions of the long groove portions 72A of the socket retaining portions 72 (see also FIG. 14 (A) which illustrates the restricted portions 132). At this time, the restricted portions 132, 332, 532 are positioned spaced by a gap from the inner edges of the long groove portions 72A in the up-down direction and connector array direction. As a result, motion (floating) of the restricted portions 132, 332, 532 and, by extension, the movable socket housings 130, 330, 530 in the upward direction (Z1 direction) and in the connector array direction (X1 direction and X2 direction) is permitted within the bounds of the above-mentioned gap, and further motion is restricted by abutment of the restricted portions 132, 332, 532 against the inner edges of the long groove portions 72A.

In addition, in the present embodiment, in which the movable socket housings 130, 330, 530 are abuttable against the inner edges of the socket slots 75, in other words, the lateral edges (edges extending in the terminal array direction) of the bridging portions 74 in the connector array direction, motion (floating) of the movable socket housings 130, 330, 530 in the connector array direction (X1 direction and X2 direction) beyond a predetermined amount is also restricted by these inner edges.

In addition, the restricted portions 232, 432, 632 of the plug connectors 20, 40, 60 are positioned directly below the plug restricting portions 73C of the plug retaining portions 73 (see FIG. 14 (B) which illustrates the restricted portions 232). At this time, the restricted portions 232, 432, 632 are positioned spaced by a gap from said plug restricting portions 73C in the up-down direction. As a result, motion (floating) of the restricted portions 232, 432, 632 and, by extension, the movable plug housings 230, 430, 630, is permitted in the upward direction (Z1 direction) within the bounds of the above-mentioned gap, and further motion is restricted by abutment of the restricted portions 232, 432, 632 against the bottom faces of the plug restricting portions 73C.

In addition, in the present embodiment, in which the movable plug housings 230, 430, 630 are abuttable against the inner edges of the plug slots 76, in other words, the lateral edges of the bridging portions 74 in the connector array direction, motion (floating) of the movable plug housings 230, 430, 630 in the connector array direction (X1 direction and X2 direction) beyond a predetermined amount is restricted by these inner edges.

Thus, in the present embodiment, motion of the movable housings 130-630 beyond a predetermined amount is restricted by each restricting portion provided in the coupling member 70. Accordingly, there is no excessive motion of the movable housings 130-630, which prevents excessive deformation of the floating portions 111C-611C of the terminals 110-610 and alleviates the load applied to said floating portions 111C-611C.

In addition, in the present embodiment, the motion of the restricted portions 132-632 of the movable housings 130-630 can be tightly restricted by the coupling member 70 because said coupling member 70 is made of metal. It should be noted that the coupling member 70 does not necessarily have to be made of metal, and, for example, may be made of plastic material or another electrically insulating material as long as it has sufficient strength to restrict the motion of the restricted portions.

In addition, in the present embodiment, the socket terminals and plug terminals in all the high-speed connectors 10, 20, high-density connectors 30, 40, and power supply connectors 50, 60 are formed to be identical in shape to each other. Therefore, in all the high-speed connectors 10, 20, high-density connectors 30, 40, and power supply connectors 50, 60, terminals of one type of shape can be used for any plug terminals and socket terminals, thereby correspondingly simplifying connector fabrication and, at the same time, making it possible to reduce the cost of manufacture.

As shown in FIG. 1, the counterpart connector combination 2 is composed of the counterpart connectors matingly connected to each of the connectors 10-60 (counterpart connect bodies) of the previously discussed connector combination 1, i.e., the high-speed socket connectors 1010, high-speed plug connectors 1020, high-density socket connectors 1030, high-density plug connectors 1040, power supply socket connector 1050 and power supply plug connector 1060 (hereinbelow referred to collectively as "counterpart connectors 1010-1060" if necessary), which are retained in the coupling member 1070 in a side-by-side arrangement in the connector array direction. Since the configuration of the counterpart connectors 1010-1060 is exactly the same as the configuration of the connectors 10-60 of the connector combination 1, reference numerals obtained by adding "1000" to the reference numerals used for connectors 10-60 are assigned to the respective components of the counterpart connectors 1010-1060, and further description thereof is omitted.

In the state illustrated in FIG. 1, which immediately precedes the mating connection of the connectors, the counterpart connector combination 2 has its counterpart connectors 1010-1060 disposed in an orientation vertically inverted with respect to the connectors 10-60 of the connector combination 1. As shown in FIG. 1, in the present embodiment, among the counterpart connectors 1010-1060, a high-speed plug connector 1020, a high-speed socket connector 1010, a high-speed plug connector 1020, a high-speed socket connector 1010, a high-density plug connector 1040, a high-density socket connector 1030, a high-density plug connector 1040, a high-density socket connector 1030, a power supply plug connector 1060, and a power supply socket connector 1050 are disposed in order from the X2 side in the connector array direction (X-axis direction) in alignment with the connectors 10-60 of the connector combination 1, with a total of 10 counterpart connectors provided.

The operation of mating connection of the connector combination 1 and the counterpart connector combination 2 will be described below with reference to FIG. 1, FIG. 15 (A, B), and FIG. 16 (A, B). First, the connector combination 1 and counterpart connector combination 2 are mounted to the mounting faces of the respective corresponding circuit boards (not shown) with solder connections. As shown in FIG. 1, the counterpart connector combination 2 is then positioned above said connector combination 1 in an orientation vertically inverted with respect to the connector combination 1 so that the counterpart connectors 1010-1060 face the corresponding connectors 10-60 in the up-down direction. Next, the counterpart connector combination 2 is lowered and the counterpart connectors 1010-1060 are matingly connected to the respective connectors 10-60.

In the present embodiment, the connector combination 1 and the counterpart connector combination 2 can be matingly connected using two kinds of mating depth, specifically, a shallow mating depth illustrated in FIG. 15 (A, B) and a deep mating depth illustrated in FIG. 16 (A, B), and terminals are adapted for resilient contact at 2 points, as described below. The mating depth of the connector combinations 1, 2 is pre-selected at the design stage of the equipment in which the connector combinations 1, 2 are provided, and may be defined, for example, by the shape of the housing of the aforementioned equipment, or by the length, etc., of spacers (not shown) attached to the circuit boards externally to the connector combinations 1, 2.

In the present embodiment, in the process of connector mating, the guided portions of the plug connectors 1020, 1040, 1060 (sections corresponding to the guided portions 231A, 431A, 635B of the plug connectors 20, 40, 60) enter the guiding portions 133, 333, 533 of the socket connectors 10, 30, 50 from above and are guided downward by said guiding portions 133, 333, 533. In addition, the guided portions 231A, 431A, 635B of the plug connectors 20, 40, 60 enter the guiding portions of the socket connectors 1010, 1030, 1050 (sections corresponding to the guiding portions 133, 333, 533 of the socket connectors 10, 30, 50) from below and are guided upward by said guiding portions.

In addition, regardless of whether the mating depth of the connectors is shallow or deep, once the connectors are matingly connected, the end supporting portions 134, 334, 534 of the socket connectors 10, 30, 50 support the guided portions of the plug connectors 1020, 1040, 1060 toward the X1 side. In addition, the end supporting portions of the socket connectors 1010, 1030, 1050 support the guided portions 231A, 431A, 635B of the plug connectors 20, 40, 60 toward the X2 side. As a result, a state of contact under contact pressure is properly maintained between the paired terminals.

Due to the fact that in the present embodiment the end supporting portions of the socket connectors 10, 30, 50, 1010, 1030, 1050 are formed extending in the direction of mating connection in the end wall portions of the movable socket housings, said end supporting portions can be formed of a large size in the direction of mating connection. Accordingly, ensuring a large area of contact with the guided portions of the plug housings, i.e., providing a large surface area used to support the plug housings in the end supporting portions, makes it possible to support the plug housings in a stable condition.

In the present embodiment, the socket terminals in the socket connectors 10, 30, 1010, 1030 have most of their opposite side faces in the connector width direction (X-axis direction) exposed from within the movable socket housings, and the plug terminals in the plug connectors 20, 40, 1020, 1040 have most of their opposite side faces in the connector width direction exposed from within the movable plug housings. In addition, the receiving spaces of the movable socket housings of the socket connectors 10, 30, 1010, 1030 are open to the opposite side from the socket terminals in the connector width direction within the terminal array range. Therefore, regardless of whether the depth of mating is shallow (see FIG. 15 (A, B)) or deep (see FIG. 16 (A, B)), once the connectors are mated, that is, once the plug connectors 20, 40, 1020, 1040 are received within the receiving spaces of the socket housings 10, 30, 1010, 1030, the plug terminals are outwardly exposed from within the plug housings on the side opposite the socket terminals without being covered by the socket housings. In addition, the socket terminals are outwardly exposed from within the socket housings on the side opposite the plug terminals.

Thus, in the present embodiment, large sections exposed from within the plug housings and socket housings, which are sections of plastic material, are ensured in the plug terminals and socket terminals, and therefore, sections that may come into contact with the plug housings and socket housings are kept to a minimum. Therefore, insertion loss during signal transmission via the plug terminals and socket terminals can be adequately reduced.

The issue of whether the depth of mating should be shallow or deep can be decided, for instance, based on whether the signals transmitted via the high-speed socket connectors 10, 1010 and high-speed plug connectors 20, 1020 are high-speed signals (high-speed differential signals) or low-speed signals. Specifically, when high-speed signals are transmitted, the connector combinations 1, 2 are matingly connected using the shallow mating depth. On the other hand, when low-speed signals are transmitted, the mating depth of the connector combinations 1, 2 may be either deep or shallow.

Below, the mode of terminal connection in a mated condition will be described separately for when high-speed signals (high-speed differential signals in the present embodiment) are transmitted and for when low-speed signals are transmitted.

High-speed signal transmission will be described first. As discussed previously, if high-speed signals are transmitted, the mating depth of the connector combinations 1, 2 is set to the shallow mating depth. FIG. 15 (A) shows a cross-sectional view taken at the location of a high-speed signal terminal 111 and a high-speed signal terminal 1211 when a high-speed socket connector 10 and a high-speed plug connector 1020 are in a shallow mated state. In addition, FIG. 15 (B) is a cross-sectional view illustrating the high-speed signal terminal 111 and the high-speed signal terminal 1211 alone. While this FIG. 15 (A, B) is an example illustrating how the high-speed signal terminals are connected, the mode of connection of the ground terminals is the same. In addition, while FIG. 15 (A, B) illustrates an exemplary combination of a high-speed socket connector 10 and a high-speed plug connector 1020 among the various combinations of matingly connected connectors, the manner in which the terminals are connected in other connector combinations is the same.

Figure 15A:
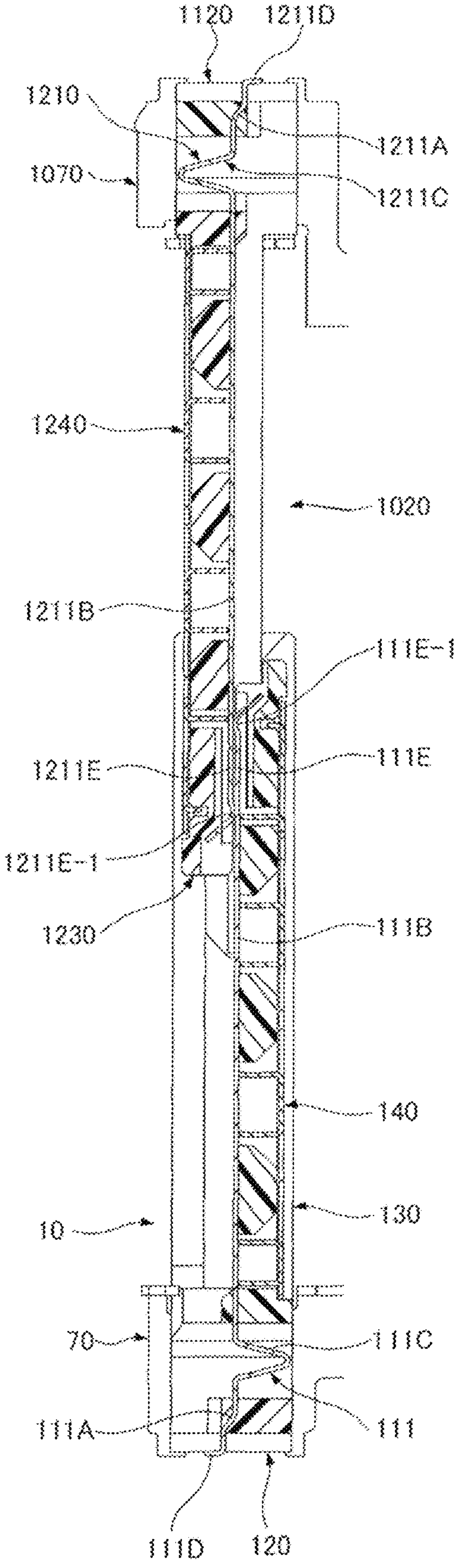
FIG. 15 (A) is a cross-sectional view taken at the location of the terminals when the high-speed socket connector and the high-speed plug connector are in a shallow mated state, and FIG. 15 (B) is a cross-sectional view illustrating the high-speed socket terminals and high-speed plug terminals of FIG. 15 (A) alone.
Figure 15B:
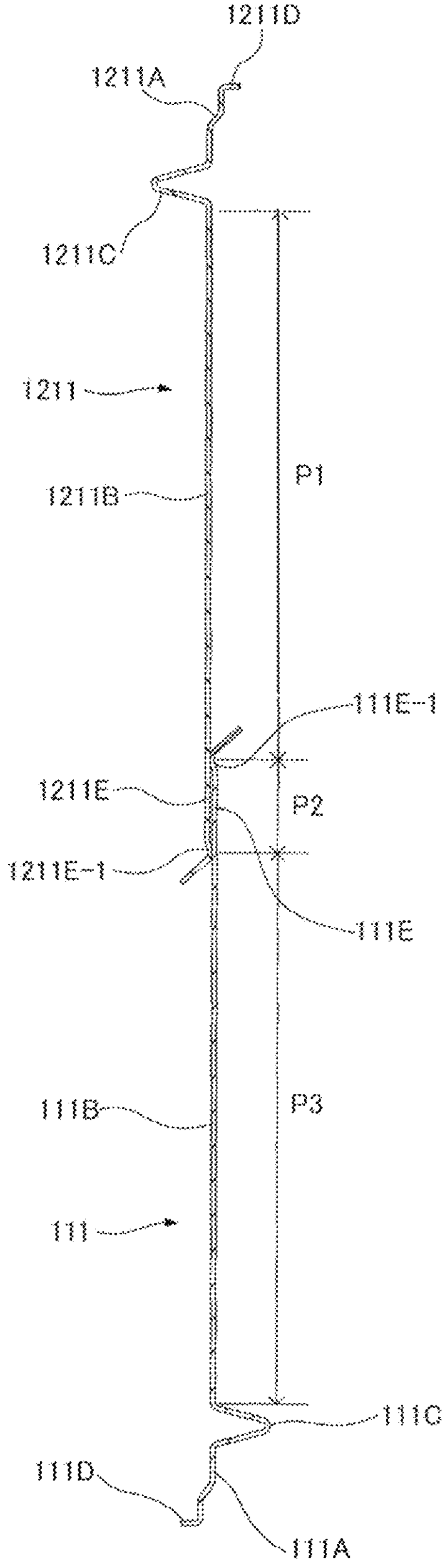

As shown in FIG. 15 (A, B), in the state of shallow mated connection, the socket contact point portion 111E-1 of the high-speed signal terminal 111 provided in the high-speed socket connector 10 makes contact with the top end section of the resilient portion (plug resilient portion) 1211E (proximal section of the resilient portion 1211E) of the high-speed signal terminal 1211 provided in the high-speed plug connector 1020. On the other hand, the plug contact point portion 1211E-1 of the high-speed signal terminal 1211 is placed in contact with the bottom end section of the resilient portion 111E (proximal section of the resilient portion 111E) of the high-speed signal terminal 111.

Thus, the high-speed signal terminal 111 and the high-speed signal terminal 1211 are in contact at 2 points. At this time, the signal transmission path is formed by one resilient portion 111E and one resilient portion (plug resilient portion) 1211E in the range P2 between the two contact locations (see FIG. 15 (B)). On the other hand, the signal transmission path in the range P1 above the aforementioned range P2 (see FIG. 15 (B)) is formed by one movable-side retained portion (plug retained portion) 1211B alone, and the signal transmission path in the range P3 below the aforementioned range P2 (see FIG. 15 (B)) is formed by one movable-side retained portion 111B alone. Therefore, the cross-sectional area of the signal transmission path is equal to the total of the cross-sectional areas of the two resilient portions (resilient portion 111E and resilient portion 1211E) in the aforementioned range P2, to the cross-sectional area of one movable-side retained portion 1211B in the aforementioned range P1, and to the cross-sectional area of one movable-side retained portion 111B in the aforementioned range P3.

Therefore, in the present embodiment, the cross-sectional area of the signal transmission path in the aforementioned range P2 is similar to the prior art in terms of being larger than the cross-sectional areas of the aforementioned ranges P1, P3. However, in the present embodiment, the cross-sectional area of the resilient portions 111E, 1211E is smaller than the maximum cross-sectional area of the movable-side retained portions 111B, 1211B. Accordingly, the total cross-sectional area of the signal transmission path in the aforementioned range P2 is less than two times the cross-sectional area of the signal transmission path in the aforementioned ranges P1, P3. As a result, the change in the cross-sectional area of the signal transmission path and, by extension, the change in impedance within and outside the aforementioned range P2 is smaller than in the prior art.

Therefore, in the present embodiment, return loss generated in the aforementioned range P2 is reduced by using the shallow mating depth when transmitting high-speed signals, thereby reducing the effect caused by noise on the signal and, as a result, avoiding degradation in signal transmission quality. It should be noted that while sections whose terminal width dimensions and, by extension, cross-sectional area exhibit slight changes are present in the aforementioned ranges P1, P3 themselves, the magnitude of those changes is extremely small in comparison with the magnitude of the change in cross-sectional area of range P2 relative to ranges P1, P3, and, in addition, the length of the aforementioned sections in ranges P1, P3 is extremely small in comparison with the length of range P2, which makes the generated return loss negligibly small and unlikely to be a problem.

Low-speed signal transmission will be described below. As discussed previously, when low-speed signals are transmitted, the mating depth of the connector combinations 1, 2 may be set to either deep mating depth or shallow mating depth.

The case of deep mating depth will be described first. FIG. 16 (A) shows a cross-sectional view taken at the location of a high-speed signal terminal 111 and a high-speed signal terminal 1211 when a high-speed socket connector 10 and a high-speed plug connector 1020 are in a deep mated state. In addition, FIG. 16 (B) is a cross-sectional view illustrating the high-speed signal terminal 111 and the high-speed signal terminal 1211 alone. While this FIG. 16 (A, B) is an example illustrating how the high-speed signal terminals are connected, the mode of connection of the ground terminals is the same. In addition, while FIG. 16 (A, B) illustrates an exemplary combination of a high-speed socket connector 10 and a high-speed plug connector 1020 among the various combinations of matingly connected connectors, the manner in which the terminals are connected in other connector combinations is the same.

Figure 16:
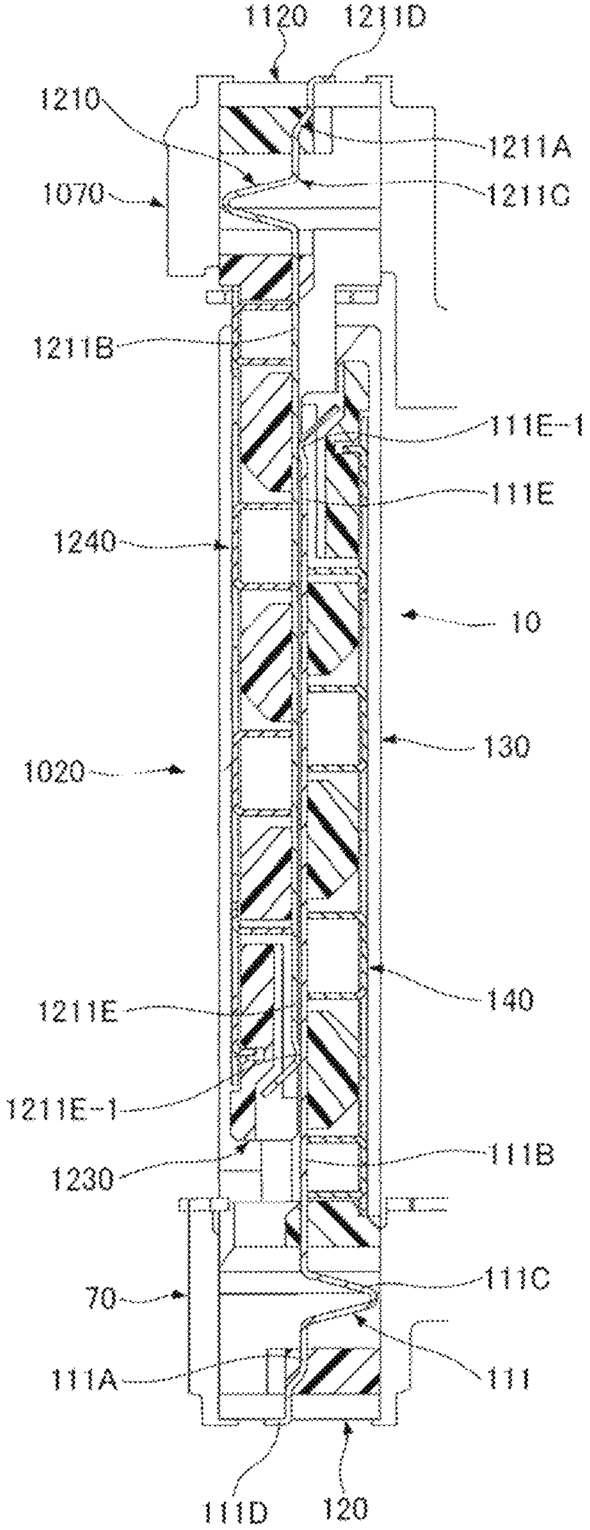
FIG. 16 (A) is a cross-sectional view taken at the location of the terminals when the high-speed socket connector and the high-speed plug connector are in a deep mated state, and FIG. 16 (B) is a cross-sectional view illustrating the high-speed socket terminals and the high-speed plug terminals of FIG. 16 (A) alone.
Figure 16:
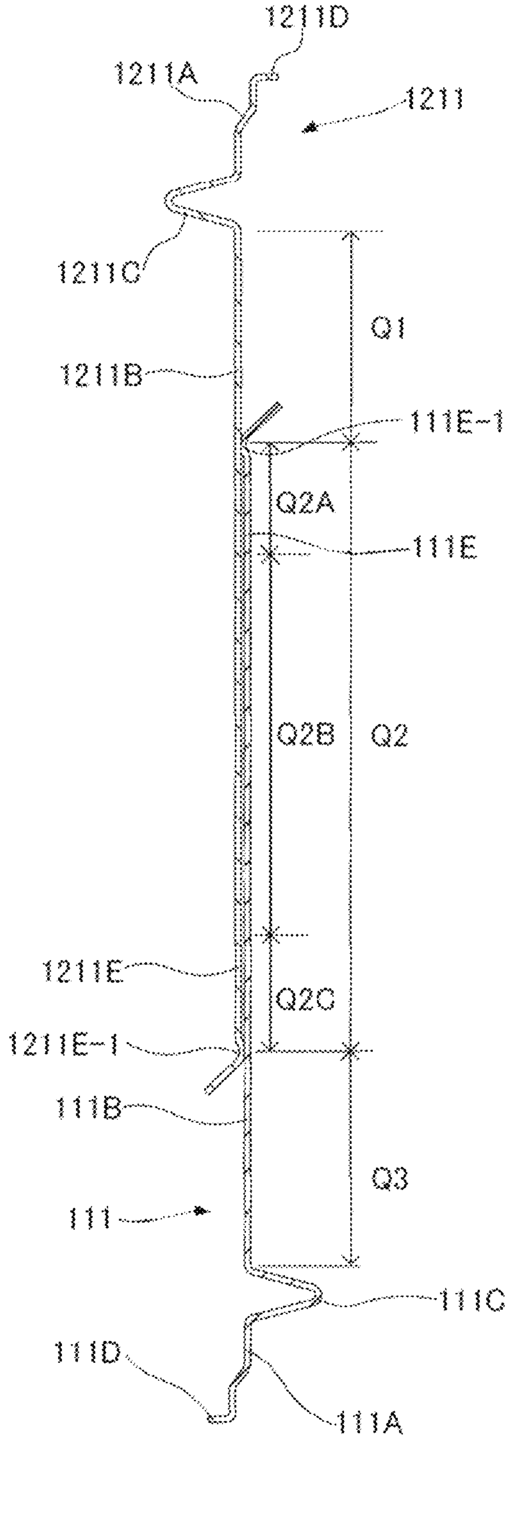

As shown in FIG. 16 (A, B), in the state of deep mated connection, the socket contact point portion 111E-1 of the high-speed signal terminal 111 provided in the high-speed socket connector 10 makes contact with the movable-side retained portion 1211B of the high-speed signal terminal 1211 provided in the high-speed plug connector 1020. On the other hand, the plug contact point portion 1211E-1 of the high-speed signal terminal 1211 is in contact with the movable-side retained portion 111B of the high-speed signal terminal 111.

With such a mode of connection, in the same manner as in the previously discussed shallow state of mated connection, the high-speed signal terminal 111 and the high-speed signal terminal 1211 are in contact at 2 points. At this time, within the range Q2 between the two contact locations (see FIG. 16 (B)), the signal transmission path is formed by one resilient portion 111E and one movable-side retained portion 1211B in the top range Q2A, by one movable-side retained portion 111B and one movable-side retained portion 1211B in the middle range Q2B, and by one movable-side retained portion 111B and one resilient portion 1211E in the bottom range Q2C. In addition, the signal transmission path in the range Q1 above the aforementioned range Q2 (see FIG. 16 (B)) is formed by one movable-side retained portion 1211B alone, and the signal transmission path in the range Q3 below the aforementioned range Q2 (see FIG. 16 (B)) is formed by one movable-side retained portion 111B alone.

Therefore, the cross-sectional area of the signal transmission path is equal to the total of the cross-sectional areas of one resilient portion 111E and one movable-side retained portion 1211B in the aforementioned range Q2A, to the total of the cross-sectional areas of one movable-side retained portion 111B and one movable-side retained portion 1211B in the aforementioned range Q2B, and to the total of the cross-sectional areas of one movable-side retained portion 111B and one resilient portion 1211E in the aforementioned range Q2C. In addition, the cross-sectional area of the signal transmission path is equal to the cross-sectional area of one movable-side retained portion 1211B in the aforementioned range Q1, and to the cross-sectional area of one movable-side retained portion 111B in the aforementioned range Q3.

Therefore, in the present embodiment, the cross-sectional area of the signal transmission path in the aforementioned range Q2 is similar to the prior art in terms of being larger than the cross-sectional areas of the aforementioned ranges Q1, Q3. Moreover, in this deep mated state, the maximum cross-sectional area of the retained portions 111B, 1211B is larger than the cross-sectional area of the resilient portions 111E, 1211E. That is to say, the cross-sectional area in the aforementioned range Q2 is larger than the cross-sectional area in the aforementioned range P2 (see FIG. 15 (B)) in the shallow mated state. Therefore, the change in the cross-sectional area of the signal transmission path and, by extension, the change in impedance within and outside the aforementioned range Q2 is larger in comparison with the shallow mated state. In addition, the aforementioned range Q2 extends longer than the aforementioned range P2 in the up-down direction. As a result, the return loss generated by the change in impedance within the aforementioned range Q2 in the deep mated state is larger in comparison with the shallow mated state. However, when low-speed signals are transmitted, the return loss is slightly larger, but the effect of noise on the signal is smaller than when high-speed signals are transmitted. Therefore, it is quite possible to transmit low-speed signals even in the deep mated state.

In addition, in the deep mated state, the plug contact point portions of the power supply plug terminals of the power supply plug connector 1060 are placed in contact with approximately the bottom half (section located below the resilient portions 511E, 512E) of the stationary-side retained portions 511B (see FIG. 11 (A-C)) of the first power supply terminals 511 provided in the power supply socket connector 50. At this time, the stationary-side retained portions 512B of the second power supply terminals 512 are superimposed on approximately the bottom half of the stationary-side retained portions 511B, with the contact pieces 512B-2 of said stationary-side retained portions 512B placed in contact therewith.

On the other hand, the socket contact point portions 511E-1, 512E-1 of the power supply socket terminals 510 are in contact with approximately the top half of the stationary-side retained portions of the power supply plug terminals provided in the power supply plug connector 1060 (section located upwardly of the resilient portions in the orientation of FIG. 1). At this time, the stationary-side retained portions of the second power supply terminals are superimposed on approximately the top half of the stationary-side retained portions in the aforementioned power supply plug terminals, with the contact pieces of said stationary-side retained portions placed in contact therewith.

Therefore, the cross-sectional area of the transmission path of power current signals is a sum (total) of the cross-sectional area of the four resilient portions (two resilient portions of the first power supply terminals and two resilient portions of the second power supply terminals), the cross-sectional area of the stationary-side retained portions of the first power supply terminals with which these resilient portions are in contact, and the cross-sectional area of the stationary-side retained portions of the second power supply terminals making contact with said stationary-side retained portions of the first power supply terminals. Thus, in the present embodiment, superimposing two stationary-side retained portions in an electrically conductive state allows for the cross-sectional area of the transmission path of power current signals to be increased, thereby allowing a large power current to flow.

The case of shallow mating depth will be described below. If the depth of mating is set to the shallow mating depth (see FIG. 15 (A, B)), the change in the cross-sectional area of the signal transmission path within and outside the range between the locations of contact is smaller and, in addition, the length of said range is shorter in comparison with the deep mating depth, and, as discussed previously, high-speed signal transmission becomes possible. Therefore, even if low-speed signals are transmitted in the state of shallow mated connection, degradation of signal quality is unlikely to occur and low-speed signal transmission is, of course, quite possible.

Thus, when low-speed signals are transmitted, degradation of signal quality is unlikely to occur regardless of using the deep mating depth or the shallow mating depth. Therefore, for example, even if the distance between the circuit boards is changed due to modifications, etc., in the design of the electronic device equipped with the connector, such modifications can be flexibly addressed thanks to the improved degree of freedom in setting the depth of mating for low-speed signal transmission. As a result, this helps avoid increases in the time or cost of manufacture of the connector.

DESCRIPTION OF THE REFERENCE NUMERALS

1 Connector combination
2 Counterpart connector combination
10, 1010 High-speed socket connector
20, 1020 High-speed plug connector
30, 1030 High-density socket connector
40, 1040 High-density plug connector
50, 1050 Power supply socket connector
60, 1060 Power supply plug connector
70, 1070 Coupling member
71 Coupling portion
72A Long groove portion (groove portion)
73C Plug restricting portion
77 Anchoring portion
110 High-speed socket terminal
111 High-speed signal terminal
111A Stationary-side retained portion
111B Movable-side retained portion (socket retained portion)
111C Floating portion
111C-1 Curved apex portion
111E Resilient portion (socket resilient portion)
111E-1 Socket contact point portion
120 Stationary socket housing
121 Stationary-side end wall portion
122 Press-fit portion
130 Movable socket housing
132 Restricted portion
133 Guiding portion
134 End supporting portion
136 Receiving space
210 High-speed plug terminal
211, 1211 High-speed signal terminal
211A Stationary-side retained portion
211B, 1211B Movable-side retained portion (plug retained portion)
211C Floating portion
211C-1 Curved apex portion
211E, 1211E Resilient portion (plug resilient portion)
211E-1, 1211E-1 Plug contact point portion
220 Stationary plug housing
221 Stationary-side end wall portion
222 Press-fit portion
230 Movable plug housing
231 Movable-side end wall portion
231A Guided portion
232 Restricted portion

The invention claimed is:

1. An electrical connector for circuit boards disposed on a mounting face of a circuit board, said connector comprising:

a plurality of terminals arranged such that the terminal array direction is the direction parallel to the mounting face, and a housing retaining the plurality of terminals, said housing comprising a stationary housing secured to the circuit board through the medium of the terminals, and a movable housing capable of relative motion with respect to the stationary housing, and the terminals being provided spanning between the stationary housing and the movable housing, wherein:

the terminals have a connection portion that is formed at one end of the terminals and is capable of being connected to the mounting face, a contact point portion that is formed at the other end of the terminals and is capable of making contact with a counterpart connect body, a stationary-side retained portion that is retained in the stationary housing, a movable-side retained portion that is retained in the movable housing, and a floating portion that is located between the stationary-side retained portion and the movable-side retained portion and is capable of resilient deformation, and the floating portion is formed bulging in the connector width direction, which is parallel to the mounting face and perpendicular to the terminal array direction.

2. The electrical connector for circuit boards according to claim 1, wherein the connection portion is formed extending in the connector width direction and is solder connectable to the mounting face, and the floating portion bulges toward the side opposite the connection portion in the connector width direction.

3. The electrical connector for circuit boards according to claim 1, wherein the floating portion is formed in a curved manner, and has a curved apex portion thereof formed of smaller dimensions than other parts in the terminal array direction.

4. The electrical connector for circuit boards according to claim 3, wherein at least a pair of adjacent terminals constitute a pair used for differential signal transmission, and in the pair of terminals, the dimensions between two floating portions in the terminal array direction are equal throughout the entire longitudinal extent of the floating portions.

* * * * *